US012674563B2

(12) United States Patent
Tucker et al.

(10) Patent No.: US 12,674,563 B2
(45) Date of Patent: Jul. 7, 2026

(54) MODULAR AND ADJUSTABLE LIGHTING APPARATUS AND METHODS

(71) Applicant: OPUS INNOVATION LLC, Bristol, PA (US)

(72) Inventors: Matthew Brandon Tucker, Philadelphia, PA (US); Jaroslav Valerian, Harleysville, PA (US); Aaron Gregory Effinger, Philadelphia, PA (US)

(73) Assignee: OPUS INNOVATION LLC, Bristol, PA (US)

( * ) Notice: Subject to any disclaimer, the term of this patent is extended or adjusted under 35 U.S.C. 154(b) by 0 days.

(21) Appl. No.: 18/842,521

(22) PCT Filed: Mar. 13, 2023

(86) PCT No.: PCT/US2023/015110
§ 371 (c)(1),
(2) Date: Aug. 29, 2024

(87) PCT Pub. No.: WO2023/177624
PCT Pub. Date: Sep. 21, 2023

(65) Prior Publication Data
US 2025/0172277 A1 May 29, 2025

Related U.S. Application Data

(60) Provisional application No. 63/319,615, filed on Mar. 14, 2022.

(51) Int. Cl.
*F21V 19/04* (2006.01)
*F21S 2/00* (2016.01)
(Continued)

(52) U.S. Cl.
CPC .............. *F21V 19/04* (2013.01); *F21S 2/005* (2013.01); *F21V 19/003* (2013.01); *F21V 23/06* (2013.01); *F21V 29/70* (2015.01)

(58) Field of Classification Search
CPC ........ F21V 19/04; F21V 19/003; F21V 23/06; F21V 29/70; F21V 21/30; F21V 29/763; F21S 2/005; F21S 8/026
See application file for complete search history.

(56) References Cited

U.S. PATENT DOCUMENTS

2004/0066142 A1 4/2004 Stimac et al.
2012/0170287 A1 7/2012 Hing Chuen et al.
(Continued)

FOREIGN PATENT DOCUMENTS

KR 1020120037475 A 4/2012
KR 20130043787 A * 5/2013 ............. F21V 17/10
KR 101879215 B1 7/2018

OTHER PUBLICATIONS

English translation of Min KR-20130043787-A (Year: 2013).*
(Continued)

*Primary Examiner* — Evan P Dzierzynski
(74) *Attorney, Agent, or Firm* — Norris McLaughlin, PA

(57) ABSTRACT

Modular lighting apparatus and method of using whereby a heat sink is provided including a first mechanical pad and a first mating electrical connector; and a light pod is releasably secured to the heat sink, wherein the light pod further includes a mounting ring, a second mechanical pad or secondary circuit board, and a second mating electrical connector; wherein the second mating electrical connector of the light pod mates with the first mating electrical connector of the heat sink; and wherein the second mechanical pad or secondary circuit board of the light pod makes contact with the first mechanical pad of the heat sink when the light pod is removably secured to the heat sink; and
(Continued)

wherein the mounting ring tightens and releasably secures the light pod to the heat sink. The light pod is replaced after use without the need for tools.

25 Claims, 25 Drawing Sheets

(51) Int. Cl.

| | |
|---|---|
| ***F21V 19/00*** | (2006.01) |
| ***F21V 23/06*** | (2006.01) |
| ***F21V 29/70*** | (2015.01) |

(56) References Cited

U.S. PATENT DOCUMENTS

| | | | | |
|---|---|---|---|---|
| 2013/0039071 | A1* | 2/2013 | Wang | F21V 29/83<br>362/294 |
| 2013/0100682 | A1* | 4/2013 | Hsiung | F21V 29/74<br>362/373 |
| 2020/0116340 | A1* | 4/2020 | Nikooyan | F21V 21/04 |
| 2023/0040032 | A1* | 2/2023 | Danesh | F21V 29/773 |

OTHER PUBLICATIONS

Machine Translation for KR 101879215 B1 (2018).
English Abstract for KR 1020120037475 A (2012).
International Search Report from corresponding PCT/US2023/015110 mailed Jun. 29, 2023.

* cited by examiner

MODULAR AND ADJUSTABLE LIGHTING APPARATUS AND METHODS

CROSS-REFERENCE TO RELATED APPLICATIONS

This application is a U.S. National Phase Application and which claims the benefit under 35 U.S.C. § 371 of PCT/US2023/015110, filed Mar. 13, 2023, which claims the benefit under 35 U.S.C. § 119 (e) of U.S. Patent Application Ser. No. 63/319,615 filed on Mar. 14, 2022, entitled MODULAR AND ADJUSTABLE LIGHTING APPARATUS AND METHODS, and all of whose entire disclosures are incorporated by reference herein.

BACKGROUND OF THE INVENTION

1. Field of Invention

This invention relates to modular electrical apparatuses and methods and, more particularly, to modular and adjustable lighting apparatuses and methods.

2. Description of Related Art

When permanently installed lighting fixtures need to be replaced or upgraded, many fixtures, especially in commercial buildings, include attachment points or wires that are inaccessible to the user after installation. Building lighting and controls include a plurality of wires that must be handled with care to avoid electrical hazards. When replacing lighting fixtures, these wires must often be disconnected, reconnected, and occasionally soldered to safely replace the fixture.

For example, with a suspended ceiling having a plenum space, accessing the power supply of the light fixture to facilitate removal may require removal of the entire ceiling structure if the fixture's power supply is within the plenum space. As a further example, traditional light-emitting diode (LED) fixtures are typically replaced by removing the holder used to house the LED module. These holders are usually coupled to wires with inline connectors within the heat sink or above the heat sink within the ceiling, making disconnection of the wires difficult. As the average power supply manufacturer in the general illumination market only supplies a five-year warranty, the need for frequent replacement and the difficulty of accessing these attachment points or electrical wiring can make replacement of these fixtures complicated, time-consuming, and expensive.

Therefore, there remains a need to develop lighting apparatus and methods permitting easy replacement of light fixtures with minimal disturbance to the light fixture's surroundings. The invention disclosed herein permits a manufacturer and end user to assemble or replace the LED module without removing wires from the LED module holder, cutting soldered wires, preparing thermal interface material for adequate surface connection between a new replacement LED and heat sink, or disposing of entire fixture, including the LED, heatsink, and optical assembly at end of life or in need of repair or service.

All references cited herein are incorporated herein by reference in their entireties.

BRIEF SUMMARY OF THE INVENTION

A modular light apparatus, wherein the apparatus includes a heat sink, said heat sink including a first mechanical pad and a first mating electrical connector, wherein the mechanical pad is capable of transferring electrical signal on its surface; a light pod releasably secured to the heat sink, wherein the light pod further includes a mounting ring, a mechanical holder, and a media emission surface, a second mechanical pad, and a second mating electrical connector; wherein the mechanical holder houses the media emission surface; wherein the mounting ring is coupled to the mechanical holder; wherein the second mating electrical connector of the light pod mates with the first mating electrical connector of the heat sink; wherein the second mechanical pad of the light pod makes direct contact with the first mechanical pad of the heat sink when the light pod is removably secured to the heat sink; and wherein the mounting ring tightens and secures the light pod to the heat sink when the light pod is removably secured to the heat sink.

A modular lighting apparatus is disclosed wherein the apparatus includes: a mounting unit to which a heat sink is coupled, wherein the heat sink includes an electrical conductor having a first connector (e.g., a universal connector), configured for coupling to a power supply, on a first end and a second connector (e.g., a multi-port connector) on its other end, the second connector being positioned at a base portion of the heat sink, and wherein the connector has a pair of electrical contacts; and a media holder comprising a transfer printed circuit board (PCB) and an optical assembly including a light source electrically coupled together, wherein the transfer PCB includes a corresponding pair of electrical contacts such that when the media holder is releasably secured to the base portion of the heat sink, the corresponding pair of electrical contacts are in electrical contact with the pair of electrical contacts of the second connector, thereby powering the light source without the need to connect any connectors or wires together.

A method of providing a modular light apparatus that requires no loose wires for electrically-powering said light apparatus is disclosed, said method including: providing a heat sink, wherein the heat sink includes a first mechanical pad and a first mating electrical connector, wherein the first mechanical pad is capable of transferring electrical signal on its surface; providing a light pod, wherein the light pod includes a mounting ring, a mechanical holder, and a media emission surface, a second mechanical pad, and a second mating electrical connector, wherein the mechanical holder houses the media emission surface; releasably securing the light pod to the heat sink by mating the second mating electrical connector of the light pod with the first mating electrical connector of the heat sink and allowing the second mechanical pad of the light pod to make direct contact with the first mechanical pad of the heat sink; and tightening the mounting ring to releasably secure the light pod to the heat sink.

A method of providing an adjustable light apparatus that requires no loose wires for electrically-powering the light apparatus is disclosed. The method includes: providing a heat sink coupled to a mounting unit; providing an electrical conductor associated with the heat sink such that a first end of the conductor includes a first connector (e.g., a universal connector) that is configured for coupling to a power supply and a second end of said conductor includes a second connector (e.g., a multi-port connector) is positioned at a base portion of the heat sink, wherein the second connector includes a pair of electrical contacts; providing a media holder comprising a transfer printed circuit board (PCB) and an optical assembly including a light source electrically coupled together and wherein the transfer PCB includes a corresponding pair of electrical contacts; releasably securing the media holder to the base portion of the heat sink by contacting and rotating the media holder in a first direction to cause the corresponding pair of electrical contacts to be in electrical contact with the pair of electrical contacts of said second connector, thereby energizing the light source without having to connect or disconnect any connectors or wires.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

The invention includes a modular lighting apparatus, wherein the apparatus includes: a core mounting unit; an electrical conductor comprising a multi-port connector on one end and a universal connector on the other end; a heat sink; and a media holder, wherein the media holder includes all of the optical and electronic devices for generating the light output. In certain examples, the media holder also includes all non-visible light accessories. Among other things, the media holder includes a media holder base, a media holder cover, a transfer printed circuit board (PCB), an optical assembly, and a light source. In certain examples, the media holder also includes light accessories. As such, the media holder provides a "modular design" in that it is a replaceable unit that can be easily disconnected and a new media holder installed in its place as discussed below. There is no need to "disconnect any wires or connectors" in order to remove the media holder and then install a new one.

The core mounting unit serves as an attachment point for the majority of the apparatus to a surface, such as a ceiling. In certain examples, the core mounting unit is manufactured from a metal such as aluminum, steel, iron, and copper. In other examples, the mounting unit is manufactured from an alloy such as stainless steel and brass. In further examples, the mounting unit is manufactured from ceramic. In still further examples, the mounting unit is manufactured from a plastic, such as polyvinyl chloride, polyetherimide, polybenzimidazole, polycarbonate, and acrylonitrile butadiene styrene.

Figure 2:
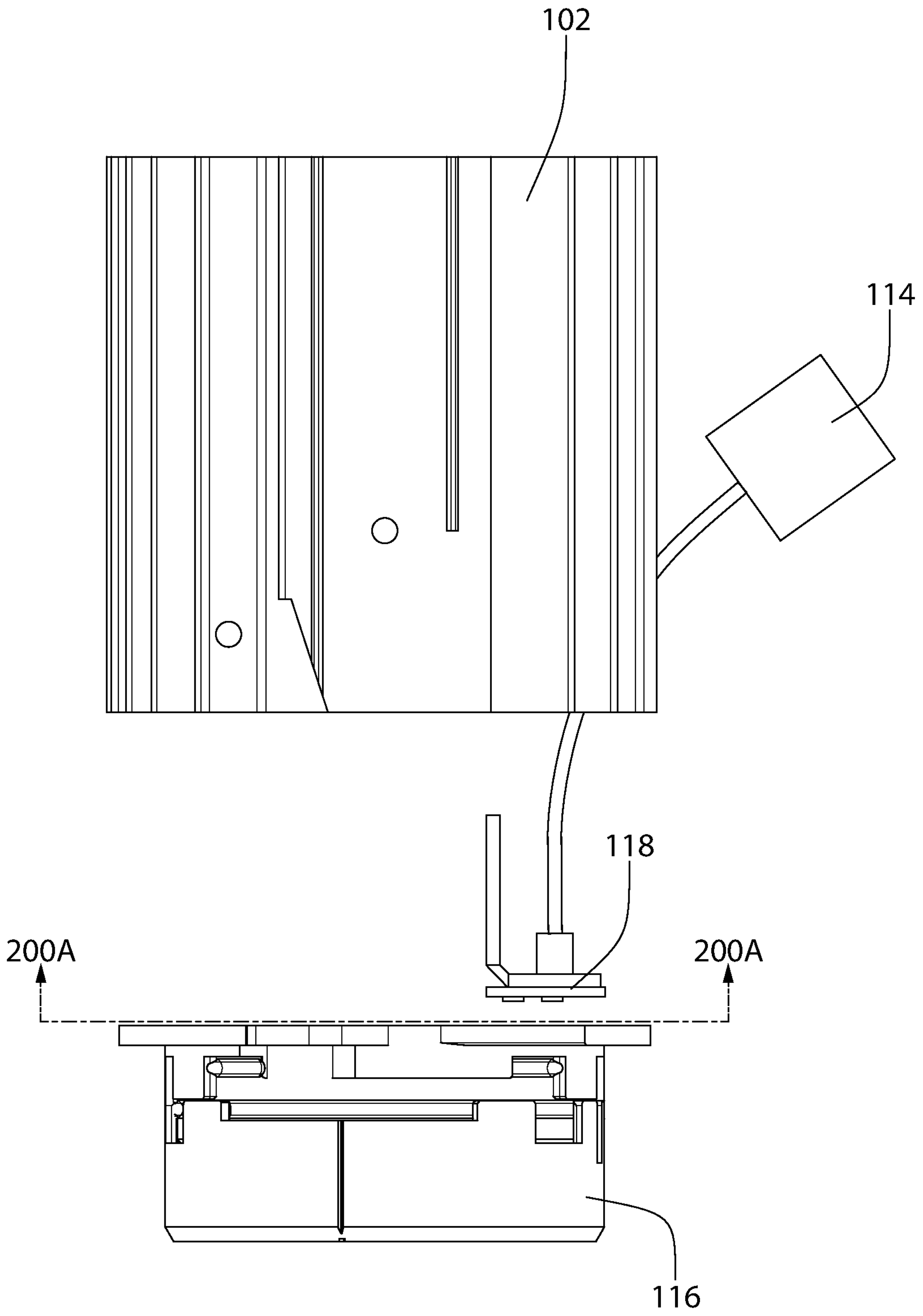
FIG. 2 is an exploded side view of only the heat sink and media holder of the invention.
Figure 2A:
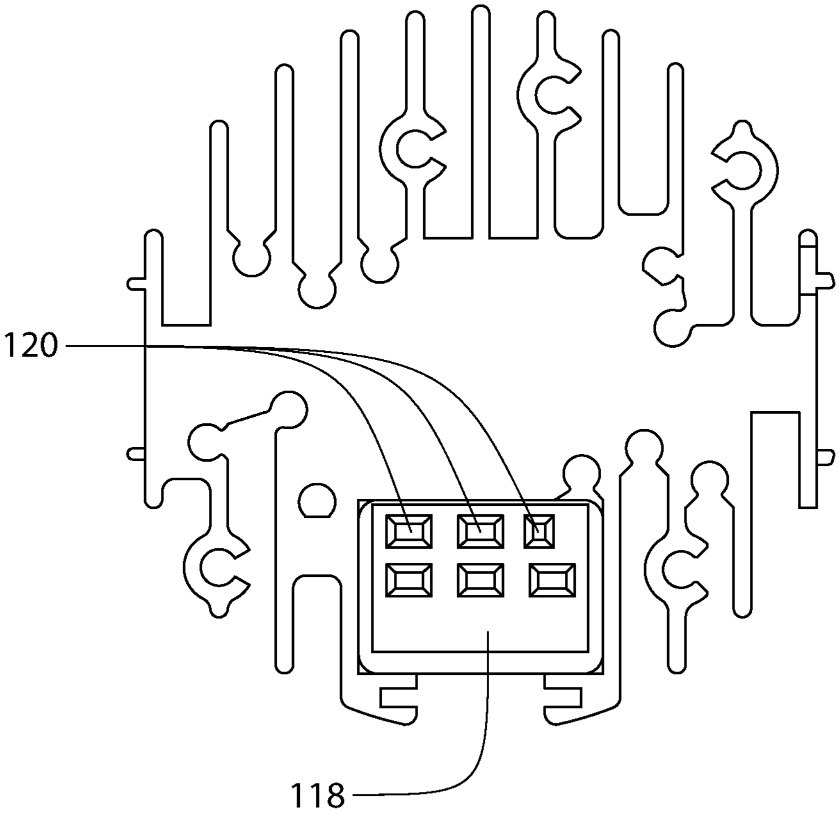
FIG. 2A is an upward view of the multi-port connector in the heat sink base taken along line 200A-200A of FIG. 2.

The media holder couples to the base of the heat sink by aligning apertures/cut-outs in the edge of the media holder base (FIG. 3) via positional alignment to the fasteners (e.g., screws) that protrude downward from the base of the heat sink (FIGS. 2, 2A). This alignment and rotation acts as a "twist and lock" feature to releasably secure the media holder to the heat sink (see FIGS. 6A-6B). One of the key features of the present invention is that the transfer PCB Board (FIG. 3) is what acts as the interface for conveying power and signal, signal conditioning, etc., to the light source (e.g., LED board) and optional light source accessories when the transfer PCB Board and the light source (e.g., chip-on-board (COB), dual-in-line package (DIP), surface-mounted device (SMD), ceramic discharge metal halide (CDM), laser, and other signal wavelength or emitting or receiving components) are coupled via edge connectors at the factory. The end user, however, need not concern himself/herself with this interface. Although not clearly shown, the upper surface of the transfer PCB Board includes positive and negative electrical contacts. When the media holder is assembled and brought into alignment with fasteners in the heat sink base, and then slightly rotated, the positive and negative contacts on the upper surface of the transfer PCB Board (FIG. 4A) are exposed through the window (FIG. 3) and align and contact with corresponding positive and negative contacts (FIG. 2A) on the multi-port connector, thereby immediately energizing the light source in the media holder from the power supply. In particular, when the end user slightly rotates the media holder, the corresponding positive contacts are connected first, followed by the corresponding negative contacts, at which time power energizes the light device. As thus can be appreciated, there are no wires or connectors that are being disconnected and then reconnected. All that is required is the engagement and slight rotation of the media holder unit at the base of the heat sink via a "twist and lock" motion.

In other examples using the multi-port connector, the apparatus is able to function even if all ports are not filled. In additional examples, the port connector is a universal port assembly.

As mentioned previously, the media holder further includes the transfer PCB, a light source, and an optical assembly. In certain examples, the optical assembly includes a lens. In certain examples, the light source includes an LED board. In additional examples, the light source is selected from the group including an incandescent bulb, a compact florescent bulb, or a halogen bulb.

In certain examples, the transfer PCB is manufactured of a material with low thermal conductivity, such as Micanite.

As a nonlimiting example, the media holder additionally includes a securing structure, such as a chip-on-board (COB) holder, wherein the COB holder secures the transfer PCB in place within the media holder.

Figure 4:
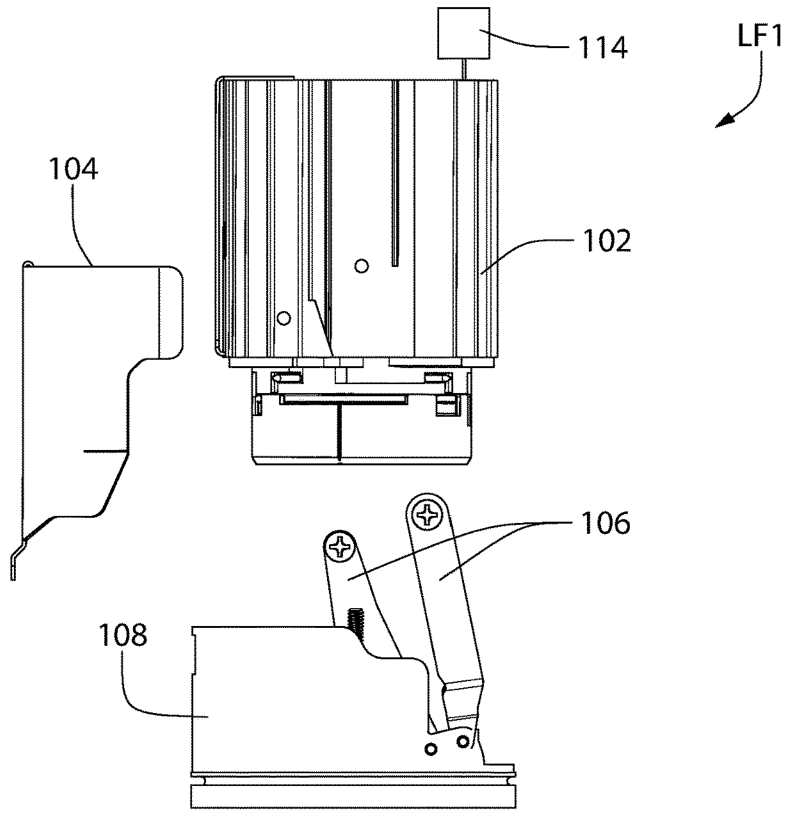
FIG. 4 is an additional exploded view of the invention showing the heat sink and media holder coupled together, including a light blocking shield, which are coupled through a hinge joint to a core mounting unit for permitting adjustment of the direction of the light.
Figure 5:
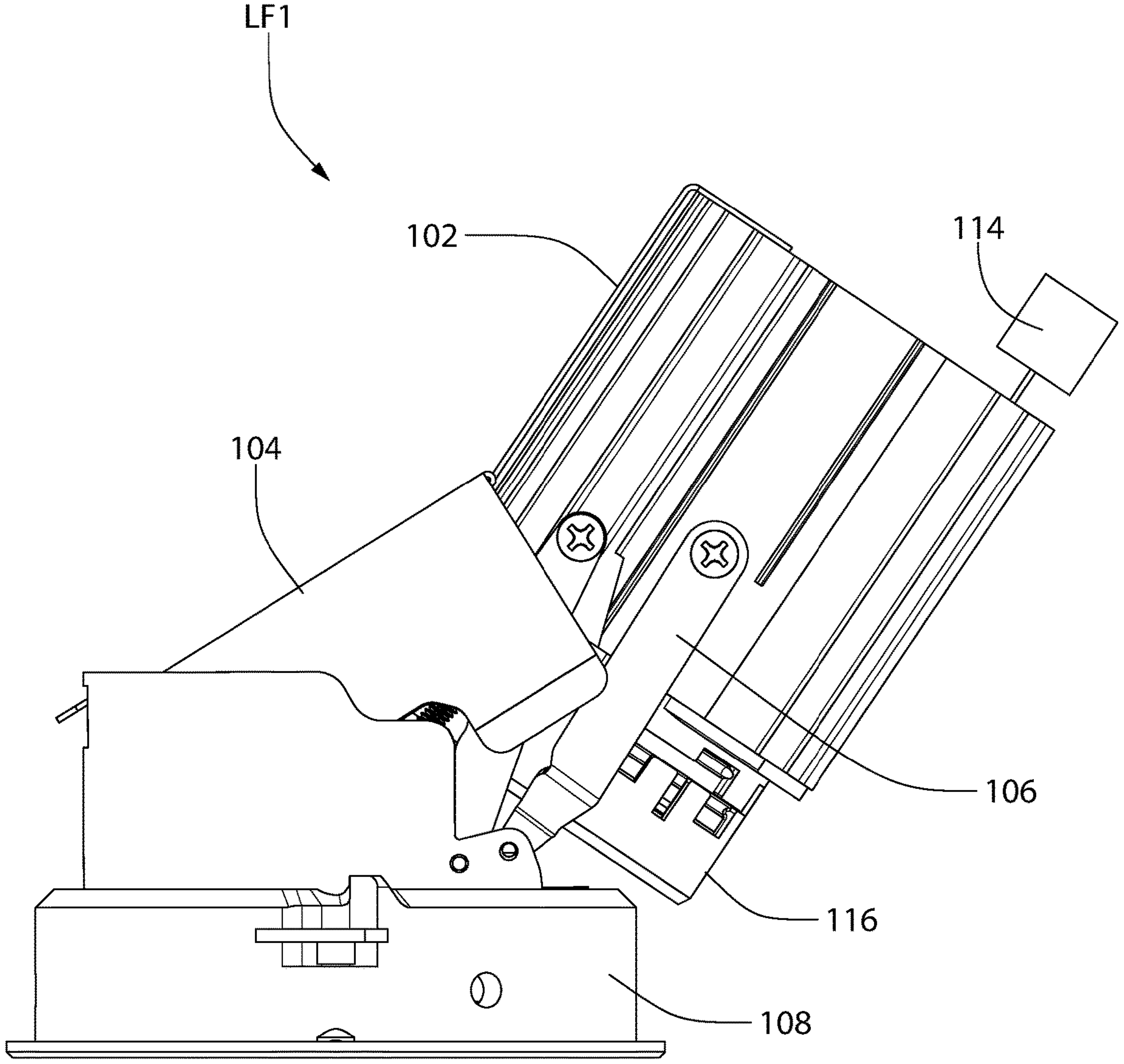
FIG. 5 is a side-view of the apparatus of the invention, wherein the heat sink-media holder-light block shield assembly are pivotable with respect to the core mounting unit.
Figure 6:
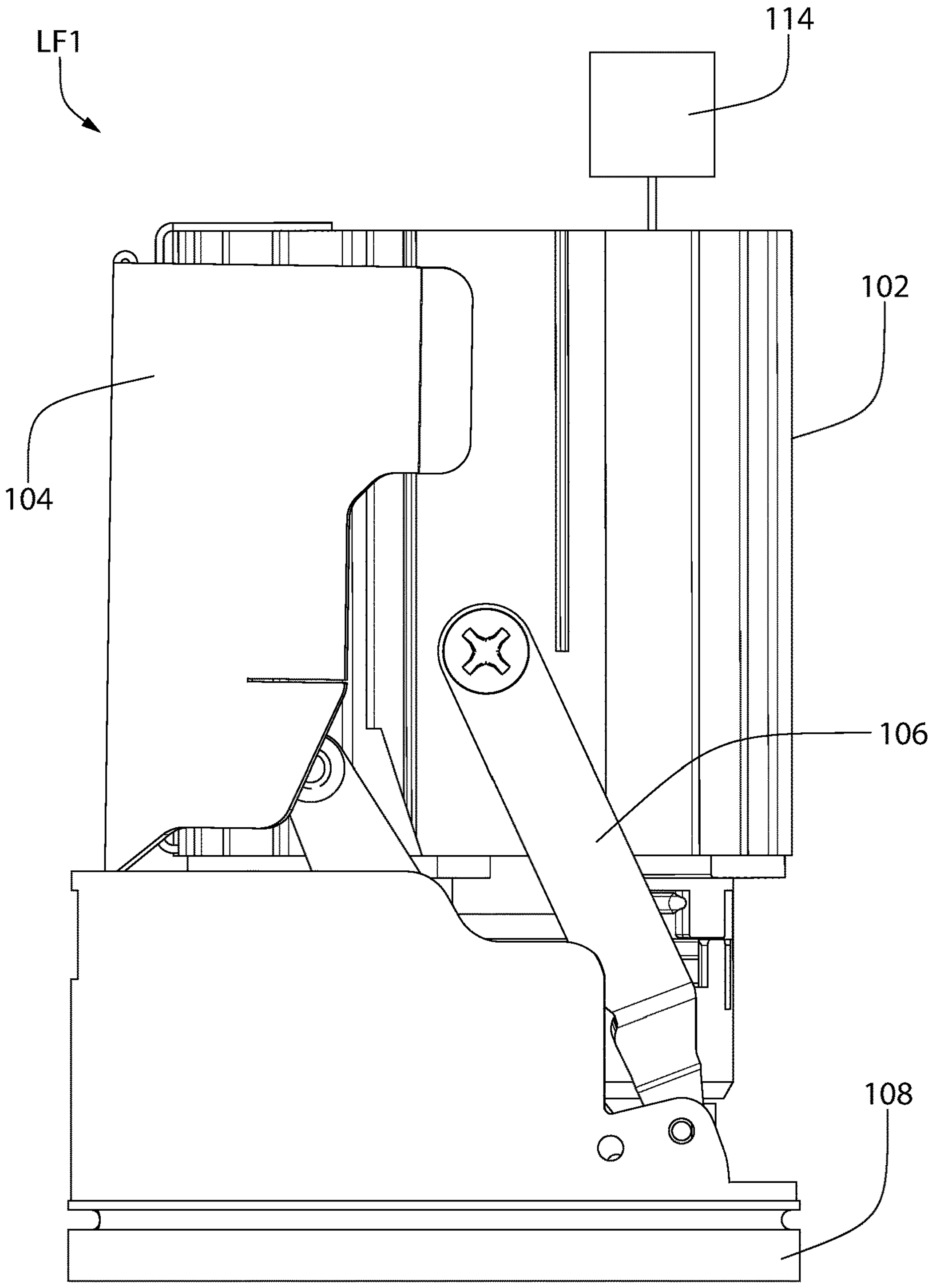
FIG. 6 is an additional side view of the invention, wherein the heat sink-media holder-light block shield assembly are vertically aligned with the core mounting unit.

As shown most clearly in FIGS. 4-6, the core mounting unit is pivotally-coupled to the heat sink by a joint, wherein the joint allows a user to adjust the positioning of the direction of the light exiting the lens of the optical assembly. In certain examples, the joint is selected from the group including but not limited to a hinge and ball-and-socket. In one non-limiting example, the apparatus uses a hinge joint, permitting the mounting unit to tilt at a 45-degree angle from the media holder and allowing the user to adjust the directionality of emitted light. It should be understood that when the invention is installed in a ceiling cavity (not shown) the heat sink is installed in a vertical orientation (viz., FIG. 6) and the core mounting unit, along with a light blocking shield, are able to pivot within a ceiling mounting unit to provide a desirable light output angle, and hence, the adjustability feature of the present invention.

As just mentioned, the apparatus may further include a light blocking shield, wherein the light blocking shield is positioned parallel to the axis of tilt and prevents misdirection of light above the lens.

The invention additionally includes a method of using the apparatus of the invention, including securing a mounting unit of the apparatus to a surface; coupling a media holder to the heat sink base in an easy twist and lock motion without having to disconnect any wire or connector; using the apparatus for the duration of the media holder's lifetime; decoupling the media holder from the mounting unit by reversing the twist and lock motion; and replacing the media holder with a new media holder, wherein the coupling step includes aligning apertures/cut-outs in the edge of the media holder base (FIG. 3) to the fasteners (e.g., screws) that protrude downward from the base of the heat sink (FIG. 2).

Figure 1:
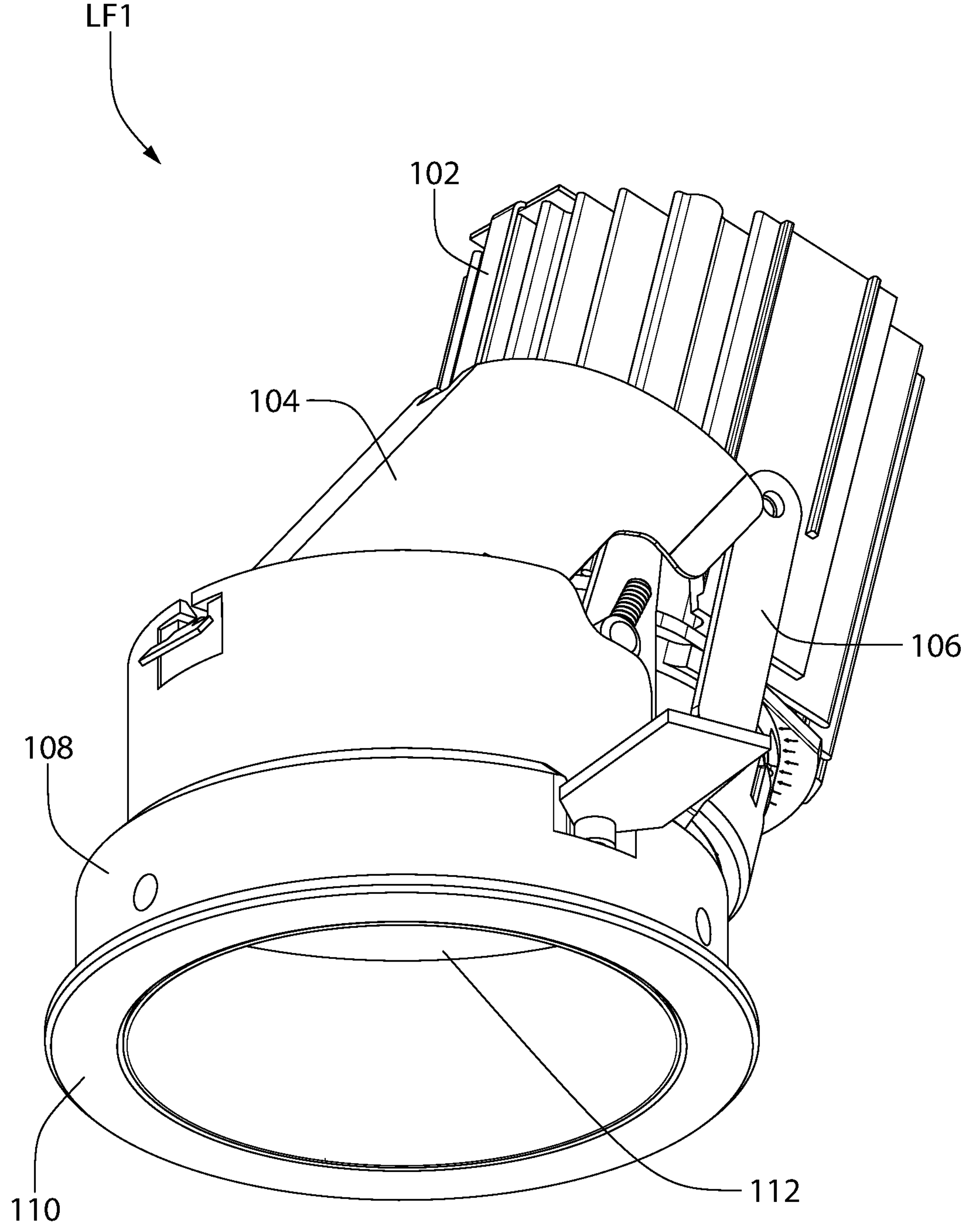
FIG. 1 is an isometric view of the apparatus.
Figure 3:
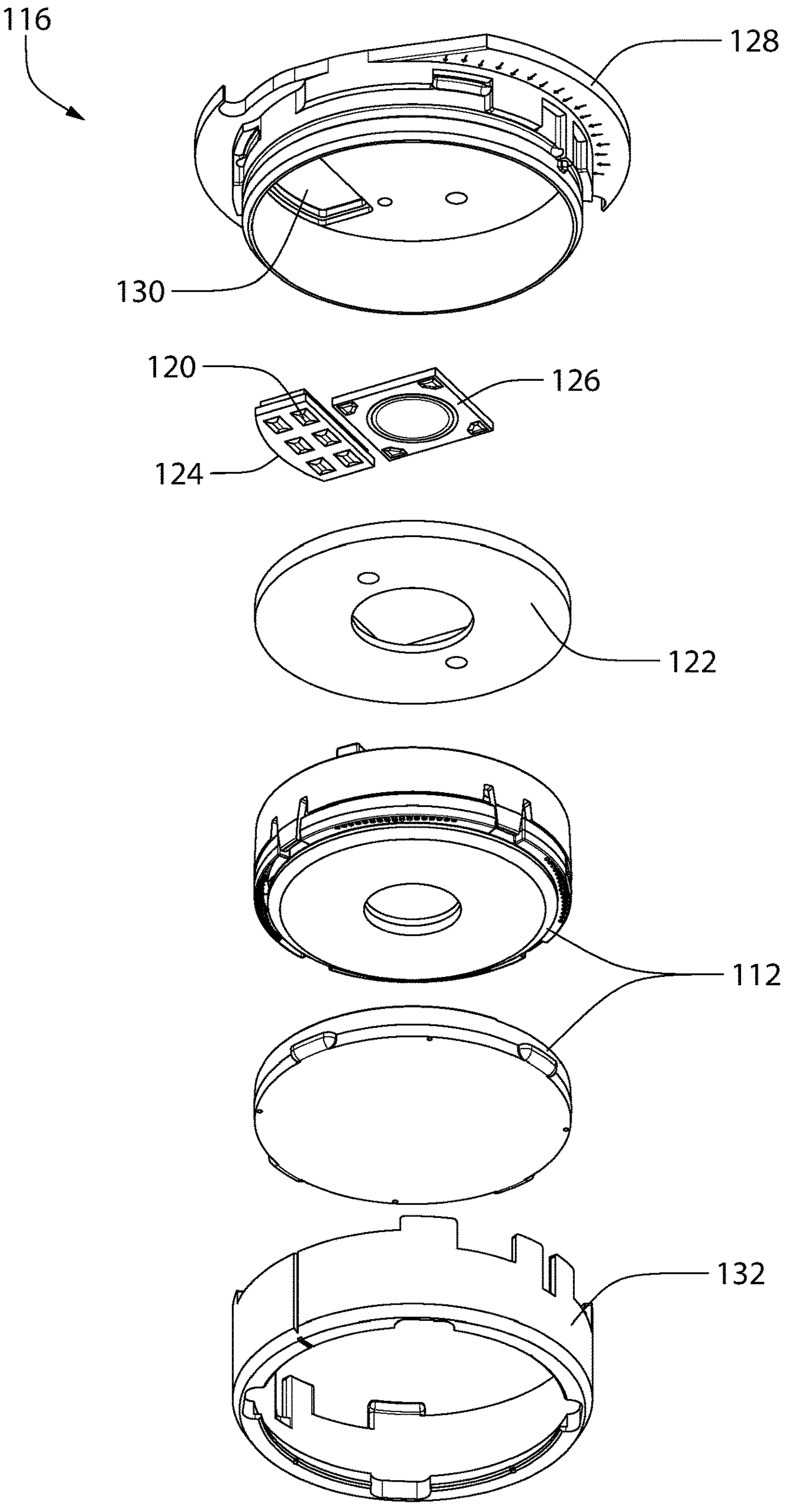
FIG. 3 is an exploded view of the media holder of the invention.

Referring to the Figures, FIG. 1 shows a side view of the apparatus LF1. In this view, the mounting unit 108, light blocking shield 104, and heat sink 102 are shown. In certain examples, the apparatus uses a universal multi-port connector 118 (FIG. 2) to connect with the contacts 120 (FIG. 2A) of the transfer PCB 124 (FIG. 3). This example further uses a joint 106 in the form of a hinge to permit the use to tilt the angle of the light source to the desired location. The mounting unit 108 is also shown having a bezel trim 110, which is comparable to the bezel trim 4 shown in the embodiment LF2 in FIG. 14, to be discussed later. The optical assembly 112 is also shown, which directs light out of the fixture LF1. The optical assembly 112 is interchangeable with the media emission surface 3*c* of FIG. 18. Further, it is understood that the heat sink 102 of the embodiment of the fixture LF1 shown in FIG. 1 is comparable with the heat sink 2 shown in FIG. 10 associated with another embodiment of the fixture LF2 of the invention.

FIG. 2 shows an exploded view of the heat sink 102 of the invention LF1. In this nonlimiting example, the apparatus includes a heat sink 102 with fasteners 134 (FIG. 6A) (e.g., screws) projecting downward and an electrical conductor comprising a multi-port connector 118 on one end and a universal connector 114 (FIGS. 2 and 5) on the other end. It should be understood that the multi-port connector 118 is positioned within a recess/cavity in the base of the heat sink and does not protrude downward as depicted in FIG. 2; this was shown this way only for clarity. Further, the universal connector 114 is configured to couple to a power supply to provide power as well as provide signal to accessory components, for example, motion sensors, wi-fi chips, test switches, Bluetooth®, and other accessories. It is also understood that in certain examples, the universal connector 114 is a 6-8 port connector. In other examples, the universal connector includes a different number of ports depending on the amount of power or signal to be transmitted (e.g., 12, 20, 30, etc.). Once the media holder 116 couples to the heat sink 102 via a twist and lock motion, the transfer PCB electrical contacts 120 (FIG. 2A) align with and are in electrical contact with corresponding electrical contacts of the multi-port connector 118 that provide power to the apparatus LF1.

FIG. 2A is an upward view of the multi-port connector 188 in the heat sink 102 base (FIG. 2) taken along line 200A-200A of FIG. 2. The plurality of PCB electrical contacts 120 are shown which align with and create electrical contact with the corresponding contacts of the multi-port connection 118 shown in FIG. 2.

Figure 2B:
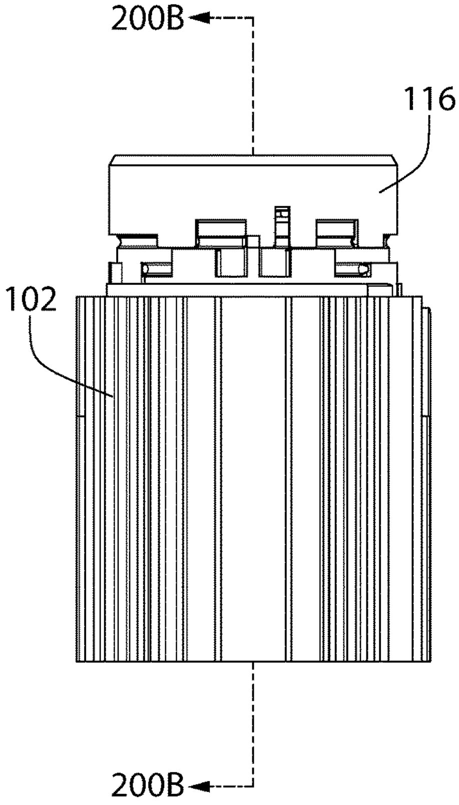
FIG. 2B is an inverted cross-sectional view of the heat sink and media holder assembly.

FIG. 2B is an inverted cross-sectional view of the heat sink 102 and media holder assembly 116. The interlocking portions of the heat sink 102 and media holder 116 are shown, permitting the twist-and-lock securing of the exemplary fixture LF1 (FIG. 1).

Figure 2C:
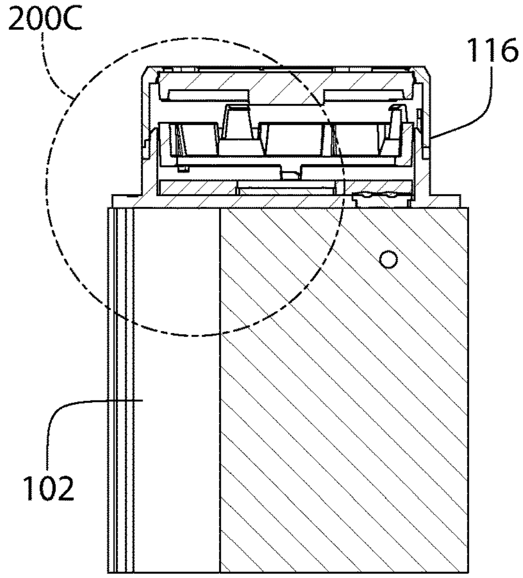
FIG. 2C is an inverted cross-sectional view of the heat sink and media holder assembly taken along line 2C-2C of FIG. 2B.

FIG. 2C is an inverted cross-sectional view of the heat sink 102 and media holder assembly 116 taken along line 200B-200B of FIG. 2B, showing the media holder 116 in a locked position.

Figure 2D:
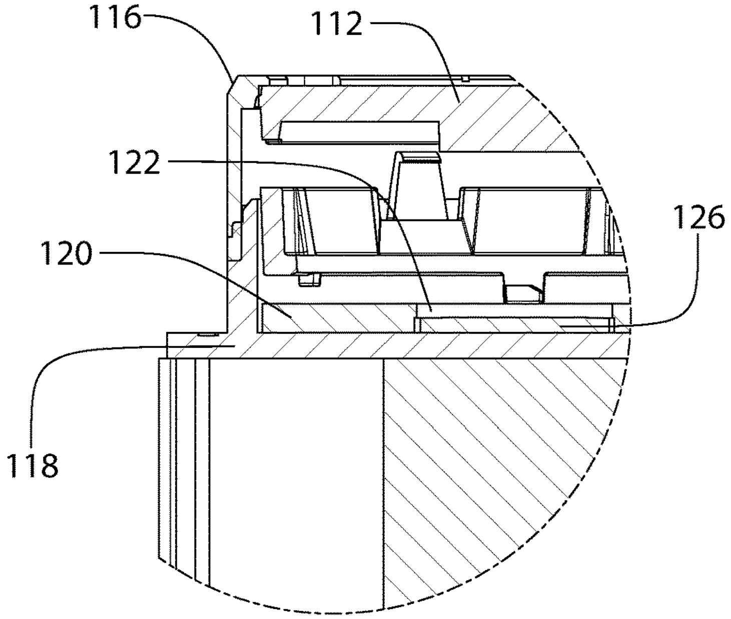
FIG. 2D is a enlarged partial view of the 2D section of FIG. 2C of the inverted heat sink and media holder assembly.

FIG. 2D is a enlarged partial view of the 200C section of FIG. 2C of the inverted heat sink and media holder assembly. The optical assembly 112 is shown coupled within the media holder 116. In certain examples, the media holder 116 includes a COB holder 122 which in turn holds the LED chip-on-board (COB) secondary circuit board 126. The transfer PCB contacts 120 are also shown making contact with a surface of the multi-port connector 118.

FIG. 3 shows an exploded view of the media holder 116 of the invention LF1. The external structure of the media holder 116 includes a media holder cover 132 and a media holder base 128. In this example, the media holder 132 cover includes a cut-out for the lens of an optical assembly 112, and the media holder base 128 includes a cut-out window 130 permitting the positive/negative contacts 120 of the transfer PCB 124 to be exposed from within the structure. The media holder 116 additionally includes an optical assembly 112, which in this example incudes a lens and a lens housing. The media holder 116 optionally further includes a COB holder 122 coupled to the optical assembly 112, wherein the COB holder 122 is configured to secure a transfer PCB 124 and LED secondary circuit board 126 in place. In this example, the LED secondary circuit board 126 serves as a light source, by way of example only, where light is directed through the lens of the optical assembly 112.

FIG. 4 shows an additional exploded view of an example of the invention LF1 using a hinge joint 106. In this example, a light-blocking shield 104 is used and coupled to the apparatus LF1 to redirect light to the desired location. The hinge joint 10 permits a user to tilt the apparatus LF1, changing the directionality of the downlight. In certain examples, the hinge joint connects the mounting unit 108 to the heat sink 102. The universal connector 114, coupled to the heat sink 102, is also shown.

Figure 4A:
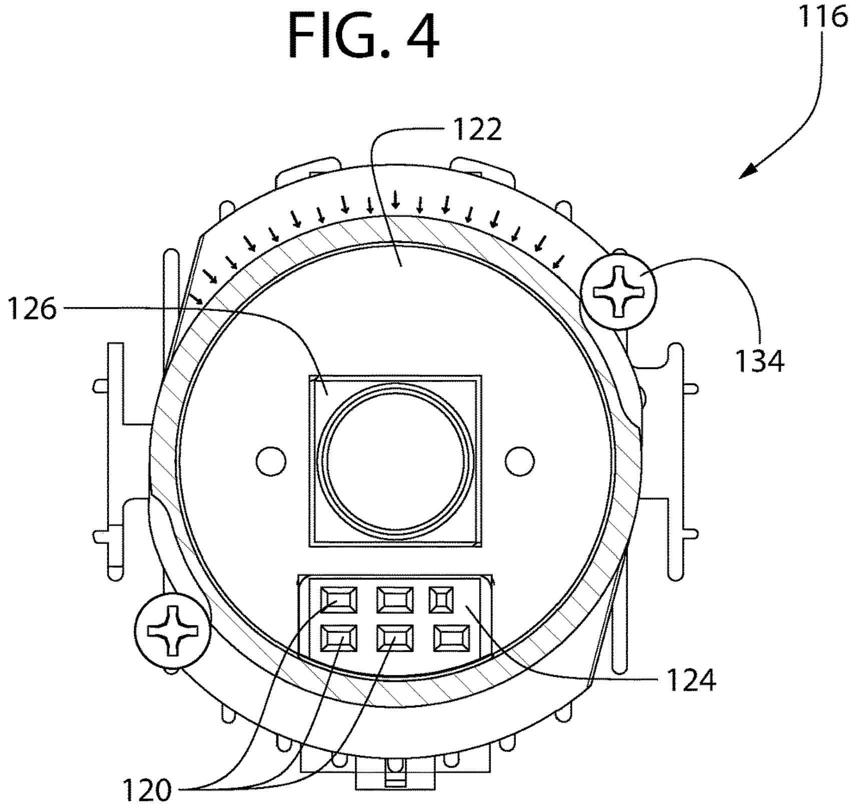
FIG. 4A is a view of the transfer PCB Board electrical contacts and LED board of FIG. 4.

FIG. 4A is a view of the transfer PCB Board 124 electrical contacts 120 and LED board 126 of FIG. 4. The COB holder 122 is shown holding the transfer PCB 124 and LED secondary circuit board 126. The COB holder 122 is coupled within the media holder 116, which secures to the heat sink 102 (FIG. 2) with fasteners 134 in a twist-and-lock formation.

FIG. 5 shows a side-view of an example of the invention LF1, wherein the apparatus LF1 is in a tilted position. In this example, the joint includes a hinge 106, wherein the hinge 106 permits the apparatus LF1 to tilt at an approximately 44 degree angle from the mounting unit 108. The light blocking shield 104 directs the light in the direction of the tilt by blocking any light from escaping upward and away from a user. It should be appreciated that the relative angle of the heat sink 102/media holder 116 to the core mounting unit 108 is depicted for clarity only; the heat sink 102/media holder 116 assembly are not pivoted within the ceiling cavity; rather, the heat sink 102/media holder 116 assembly is mounted vertically (see FIG. 6) and the core mounting unit 108 is then pivoted. The universal connector 114 is also shown coupled and extending from the heat sink 102.

Figure 18:
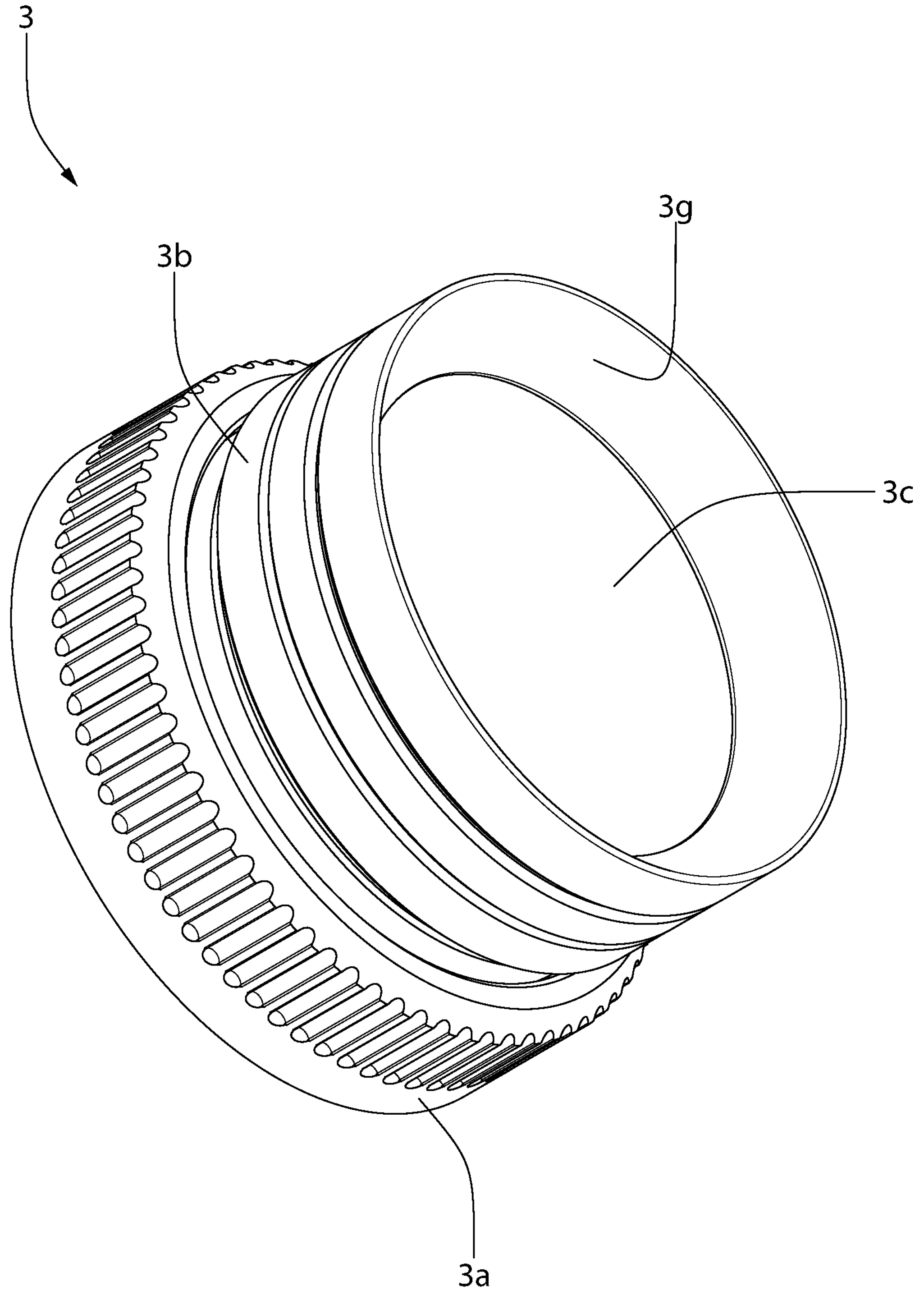
FIG. 18 shows a perspective view of an exemplary light pod.

FIG. 6 shows an additional side view of an example of the invention LF1, wherein the apparatus LF1 is in a vertical position. In this example, the light blocking shield 104 fits flush with the heat sink 102, as the light emitted from the apparatus LF1 is directed vertically downward. While the mounting unit 108 is still coupled to the heat sink 102 via the hinge 106, the apparatus LF1 is not angled. It should be understood the hinge 106 is optional. In other examples, light directionality and intensity is altered with a light pod cap 3*g* (FIG. 18). The universal connector 114 is also visible.

Figure 6A:
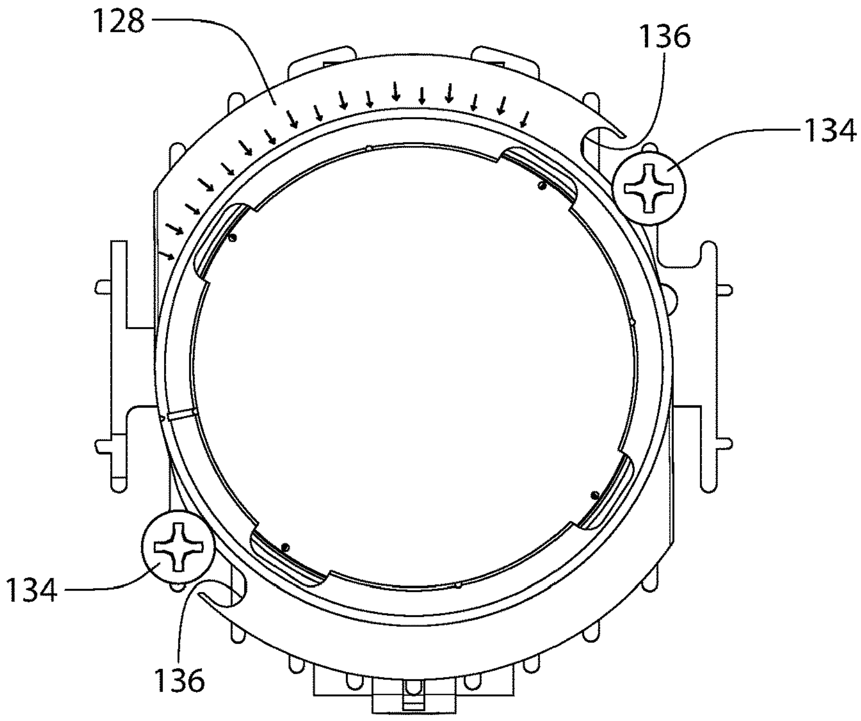
FIG. 6A is an upward view, taken along line 6A-6A of FIG. 6 showing the media holder as its media holder base element is being registered with the fasteners in the heat sink base just before final coupling.

FIG. 6A is an upward view of the media holder 116 (FIG. 5) as its media holder base element 128 is being registered with the fasteners 134 in the heat sink 102 (FIG. 6) base just before final coupling. In this nonlimiting example, the media holder base element 128 includes a plurality of recesses 136 which receive fasteners 134 when the media holder base 128 is twisted and locked into the heat sink 102 (FIG. 6).

Figure 6B:
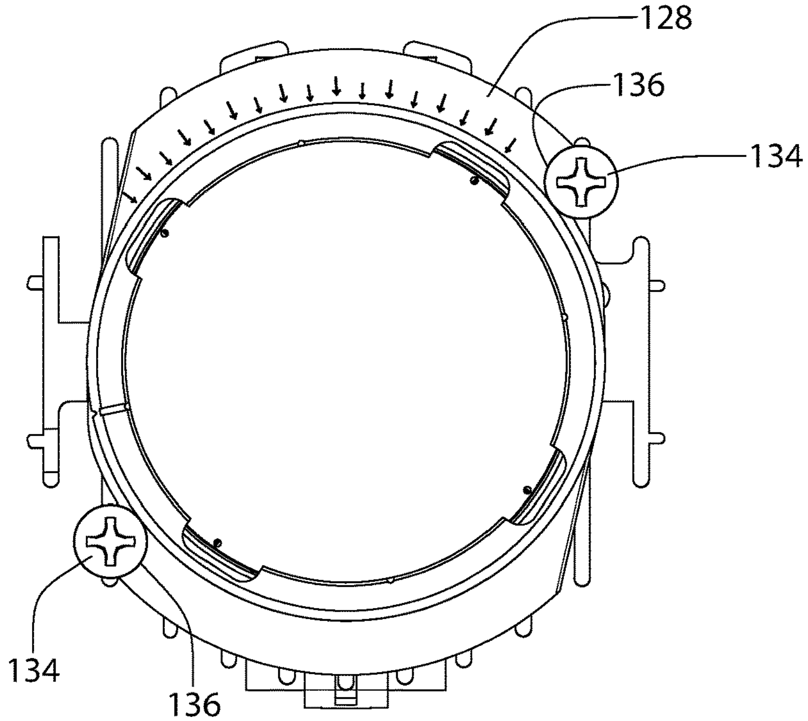
FIG. 6B is also an upward view, taken along line 6B-6B of FIG. 6 showing the media holder releasably secured to the heat sink base with electrical connection made.

FIG. 6B is also an upward view showing the media holder releasably secured to the heat sink 102 (FIG. 6) base with the electrical connection made. Here, the recesses 136 receive fasteners 134, allowing the media holder base element 128 to be secured to the heat sink 102 (FIG. 6).

Figure 7:
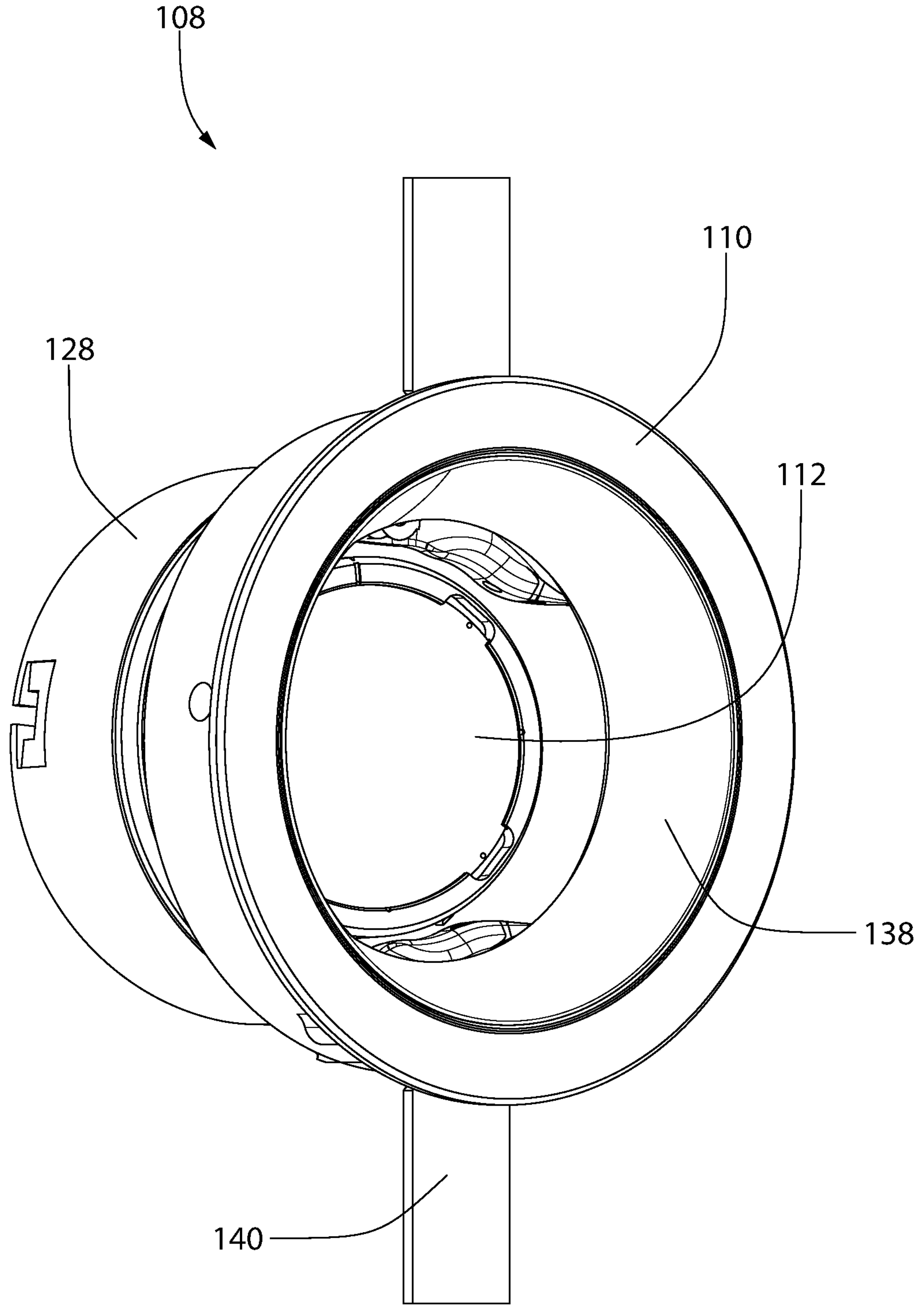
FIG. 7 is a bottom perspective view of an exemplary mounting unit and optical assembly of the invention, and showing a pair of pivotable ceiling mounting brackets for securing the invention in place within a ceiling cavity.

FIG. 7 shows a perspective view of an exemplary mounting unit 108 and optical assembly 112 of the invention. In this example, the lens of the optical assembly 112 is visible. The optical assembly 112 sits within the mounting unit 108 to secure the optical assembly 112 in place. While the mounting unit 108 surrounds the lens of the optical assembly 112, however, it is noted that the mounting unit 108 does not cover the lens of the optical assembly 112 to minimize any obstruction of light exiting from the lens itself. In this example, the mounting unit 108 further includes mounting brackets 140, wherein the mounting brackets 140 assist in coupling the mounting unit 108 to a surface such as a ceiling. The media holder base 128 is also shown. The mounting unit 108 also includes an expandable unit 138 including a bezel trim 110. The expandable unit 138 permits adjustment of the optical assembly 112.

Figure 8:
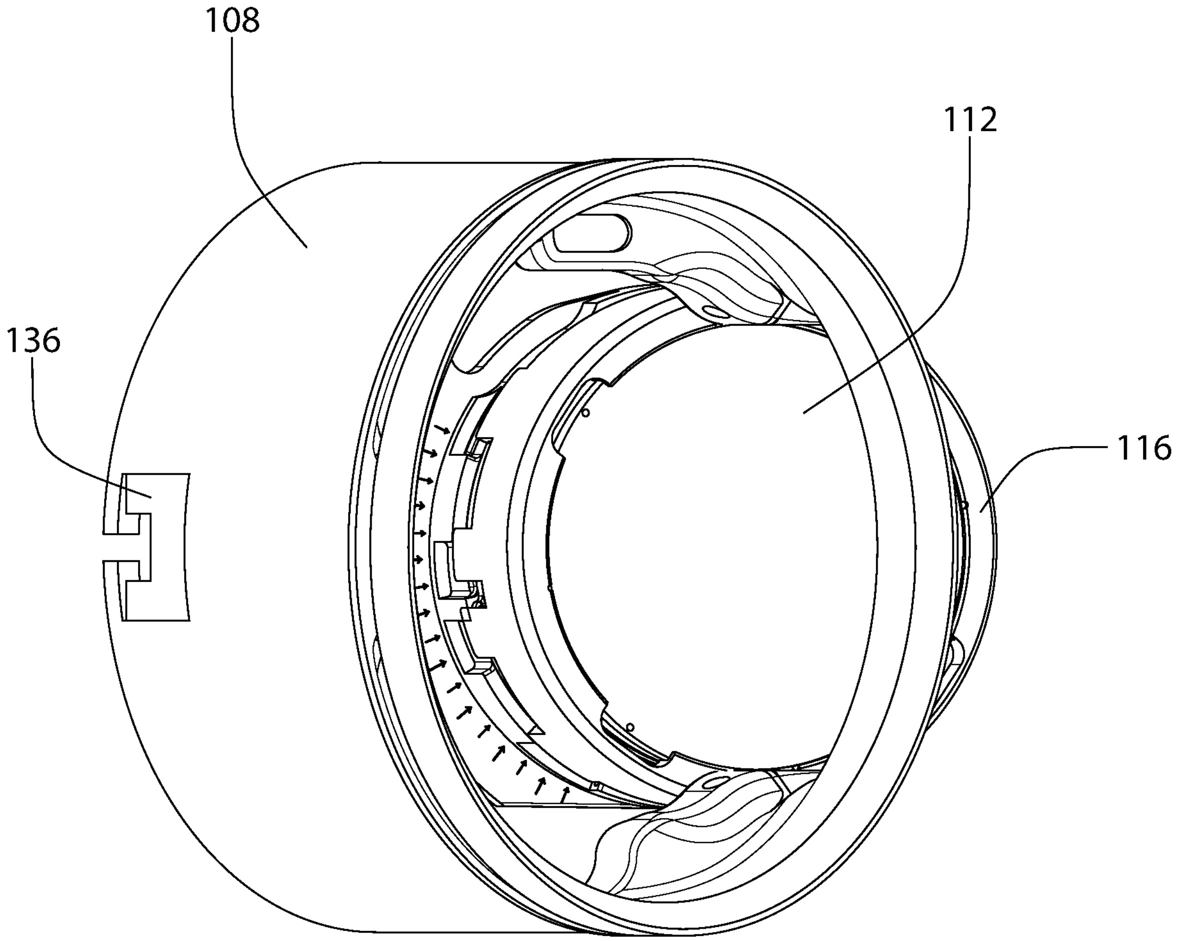
FIG. 8 a perspective view of an exemplary mounting unit and optical assembly of the invention in a tilted position.

FIG. 8 shows a perspective view of the core mounting unit 108 and optical assembly 112 of the invention in a tilted or pivoted position. As discussed above, a joint 106 (FIG. 5) permits the core mounting unit 108 of the invention to tilt independently of the heat sink 102 (FIG. 1)/media holder assembly 116, causing the lighting assembly LF1 (FIG. 1) to tilt with it. As a result, this example shows the lens of the optical assembly 112 tilting from the mounting unit 108 at an angle. The recesses 136 within the mounting unit 108 are also shown which receive fasteners 134 (FIG. 6B) such as screws.

Figure 9:
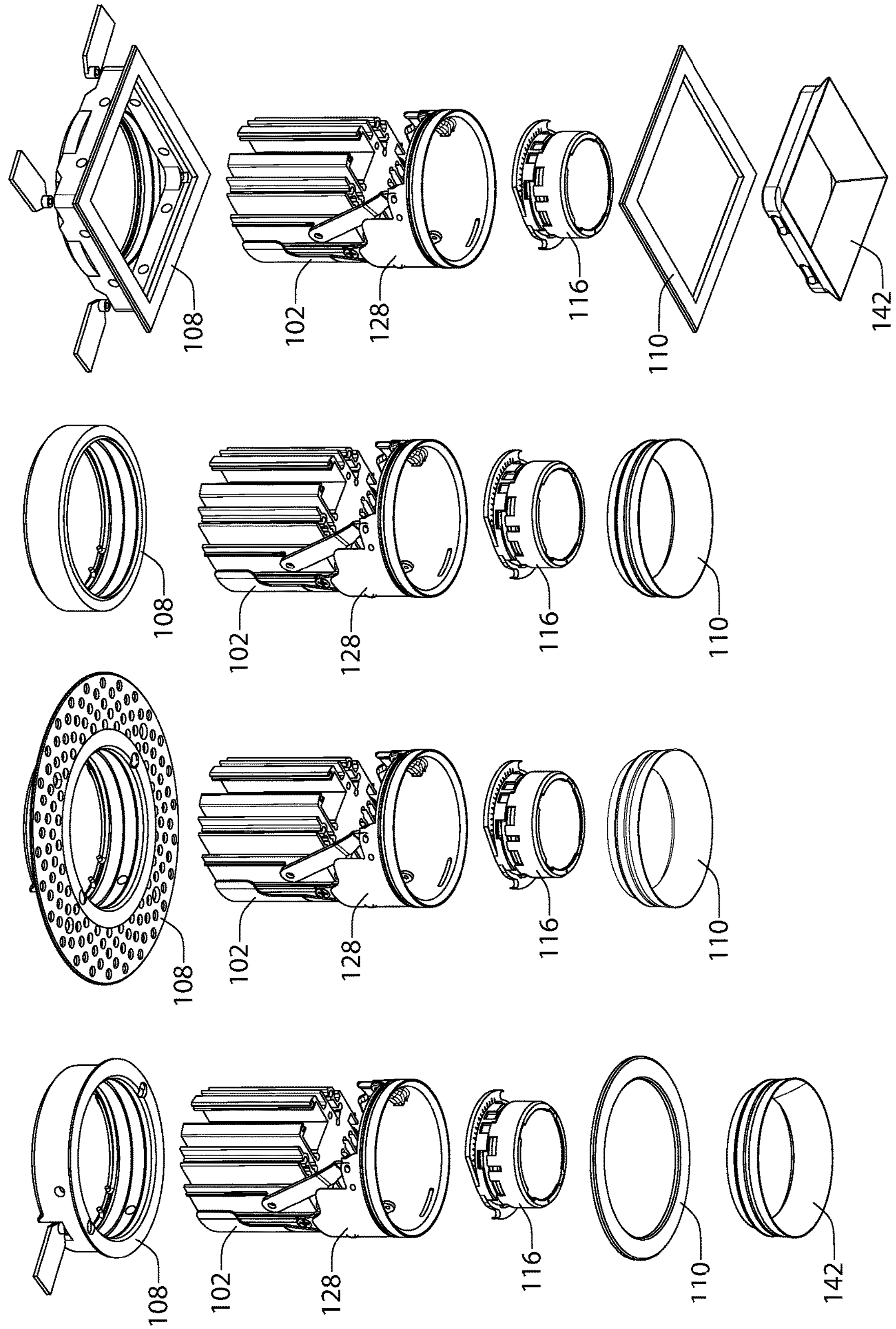
FIG. 9 is a flow chart illustrating an exemplary method of the invention while depicting different embodiments of the present invention.

FIG. 9 provides a flow chart of the key steps in assembling the apparatus of the present invention LF1. Furthermore, FIG. 9 also illustrates four, by way of example only, different embodiments of the present invention. In each example, the mounting unit 108 couples the heat sink 102 to a ceiling. Mounting unit 108 shapes vary in different examples and include round or square shapes with minimal or ornamental appearances. After the heat sink 102 is coupled to the mounting unit 108, the media holder 116 is twisted and locked into place. In certain examples, the invention also includes a bezel 110 surrounding the media holder 116. In further examples, an optional trim 142 is added for aesthetic purposes, wherein the trim 142 may be of various shapes, colors, materials, and sizes depending on the fixture and desired aesthetic.

Figure 10:
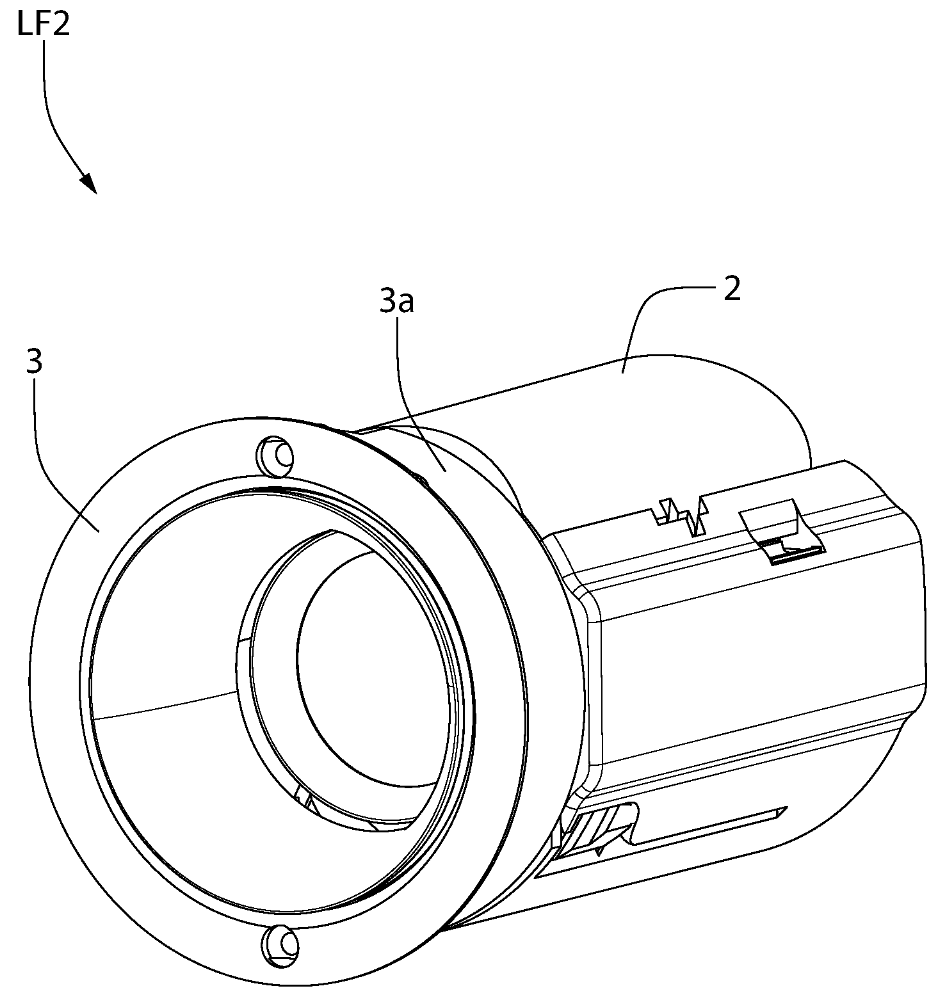
FIG. 10 shows a perspective view of another exemplary embodiment of the invention.

FIG. 10 shows a perspective view of another exemplary embodiment LF2 of the invention. Within the core light assembly 1, the heat sink assembly 2 mounts to the light pod assembly 3 without the need for any tools or loose wires between the heat sink assembly 2 and the light pod assembly 3. The light pod assembly 3, once mated with the heat sink assembly 2, is secured in place via a mounting ring 3*a* which tightens the light pod assembly 3 onto the heat sink assembly 2. The mounting ring 3*a* mounts to the heat sink assembly 2 through mechanisms including but not limited to threaded rings, a twist-and-lock assembly, a clamp, a latch, magnets, screws, pins, or other similar mechanisms permitting the light pod 3 to be releasably secured to the heat sink 2, In preferably examples, the mounting ring 3*a* mounts to the heat sink assembly 2 without the need for tools (e.g., threaded ring, twist-and-lock assembly, etc.). Together, the heat sink assembly 2 and light pod assembly 3 are the core light assembly fixture LF2. When connected to power, the core light assembly fixture LF2 can be used in different configurations. For example, multiple core light assemblies LF2 could be arranged in a single fixture to create a different aesthetic. In the example shown in FIG. 10, one core light assembly LF2 is used in a single fixture. The heat sink assembly 2 dissipates the heat generated by the light source/media emission surface 3*c* (FIG. 18) when powered on to keep the light assembly LF2 cool and maintain a long life. In different examples, the heat sink assembly 2 includes different materials, shapes, and sizes. For example, the heat sink assembly 2 may include an aluminum extrusion. The core light assembly LF2 can be designed to be accessible and serviceable from below the ceiling. Therefore, the core light assembly LF2 can be removed from below and fit through the ceiling opening.

Figure 11:
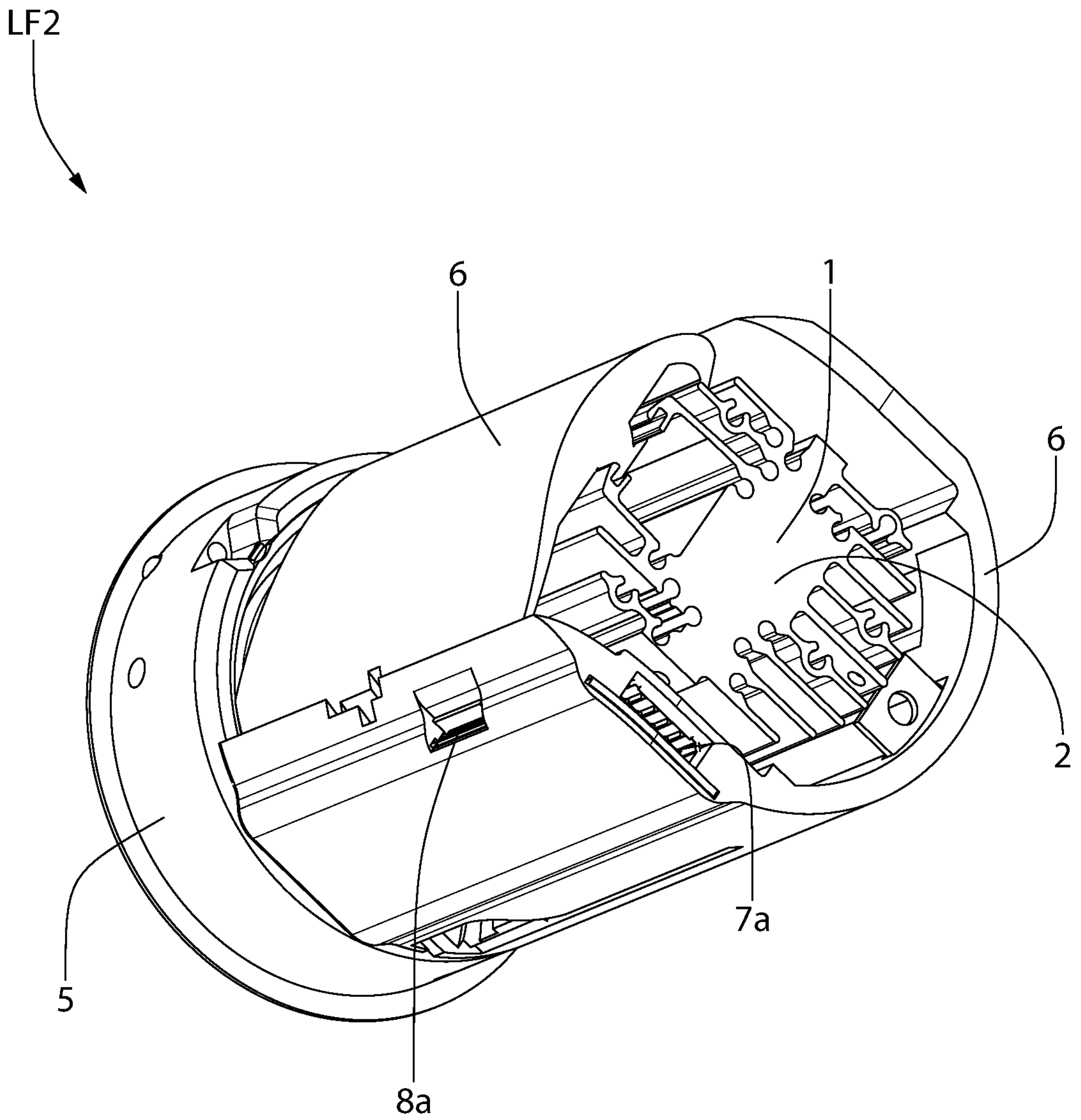
FIG. 11 shows a top angle view of an exemplary fixture of the invention.
Figure 13:
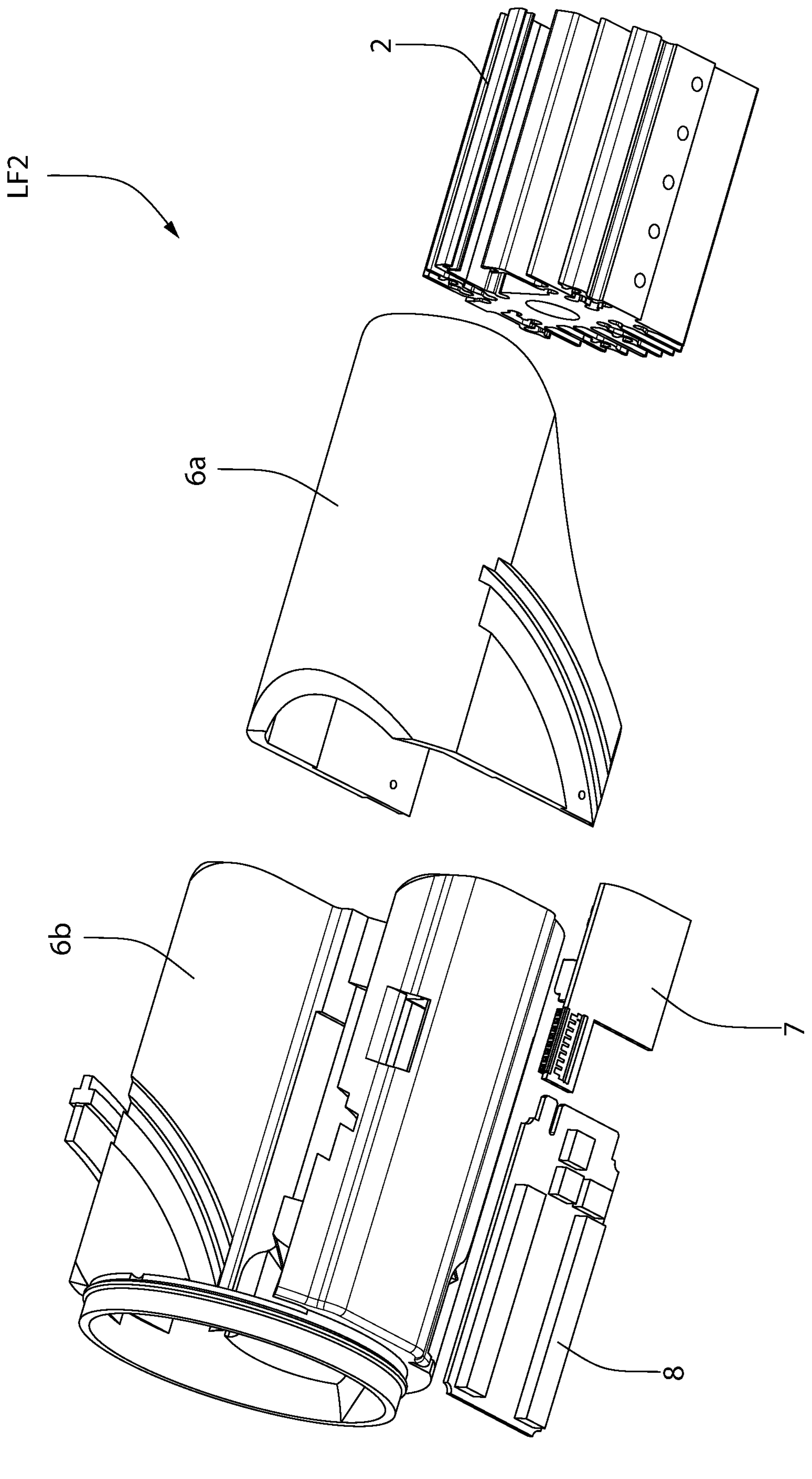
FIG. 13 shows an exploded view of an exemplary fixture of the invention.
Figure 14:
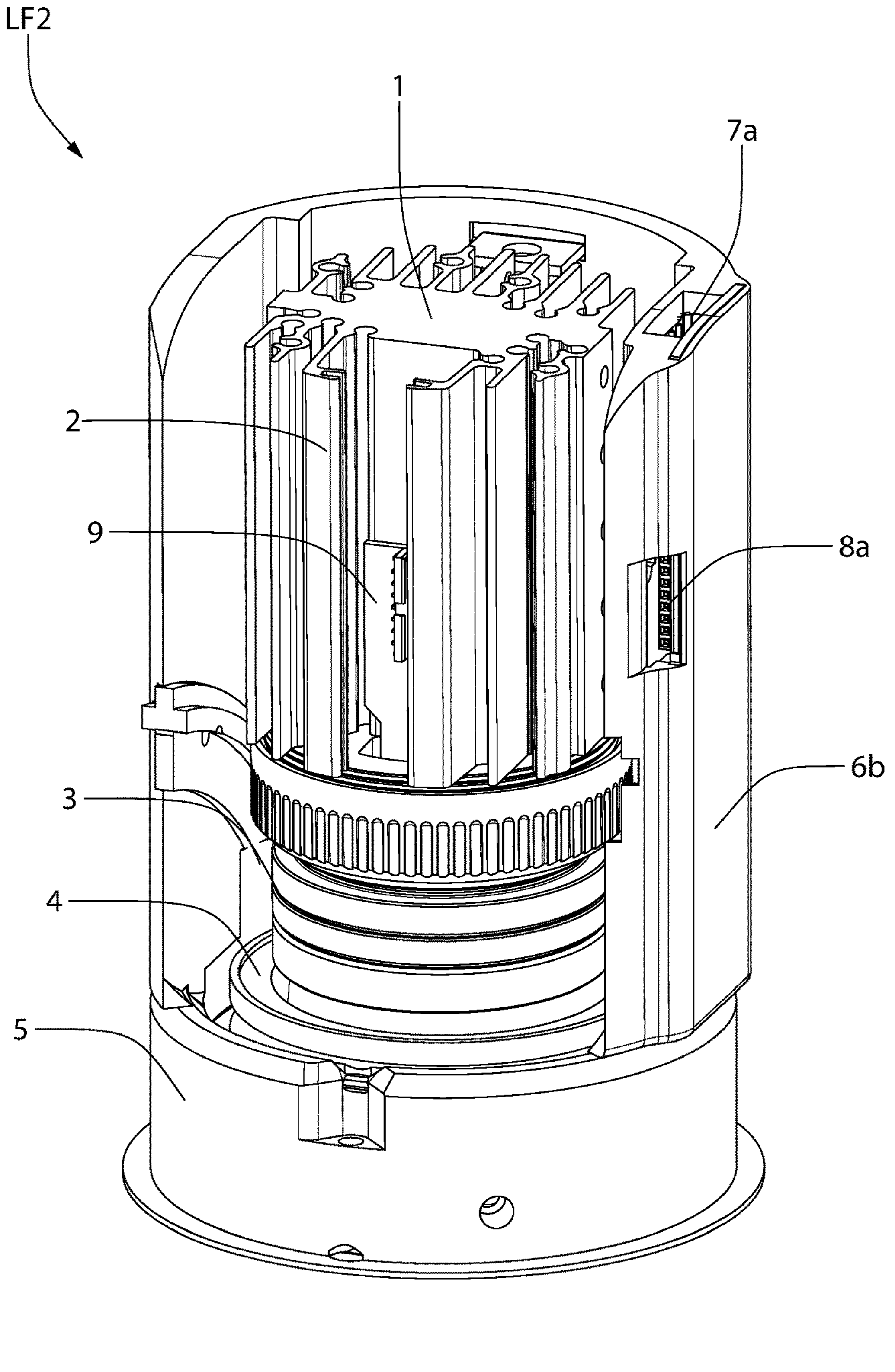
FIG. 14 shows a cross-sectional view of an optional housing mechanical component of the invention.
Figure 20:
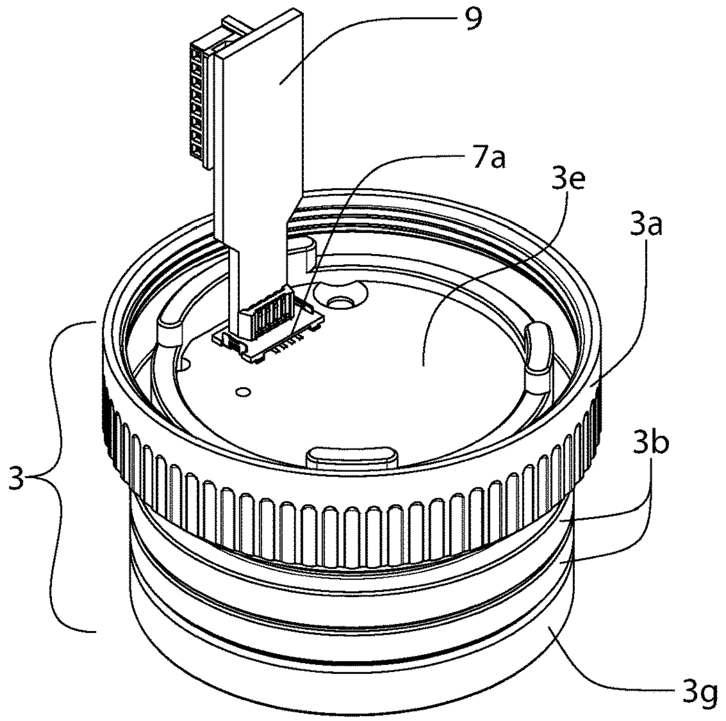
FIG. 20 shows a perspective overhead view of an exemplary light pod with the transfer board inserted into a control input.

FIG. 11 shows a top angle view of a fixture with the housing 6 around the heat sink 2 of the core light assembly 1, wherein the housing 6 is open on one end for convection passive cooling. There is a cavity shown in the extruded aluminum heat sink 2, wherein the input 7*a* for the motherboard, power, and control signal is located. The input 7*a* is mounted to the inside wall of the housing 6. There is an output 8*a* from the mother/daughter card that sends signal and power to the light pod 3 (FIG. 10). In certain examples, the signal and power is sent through transfer board 9 (FIG. 14). In examples where the fixture LF2 (FIG. 10) does not generate heat in close proximity to the motherboard 7 (FIG. 15) or if heat is otherwise diverted from the motherboard 7, the motherboard 7/daughter card 8 (FIG. 13) assembly is mounted directly to the transfer board 9 (FIG. 20). In other examples, the motherboard 7 (FIG. 15) can include the transfer board 9 (FIG. 20), wherein at least a portion of the motherboard 7/daughter card 8 assembly is located directly in the housing 6 or in the mounting supporting the light pod 3 (FIG. 10). The nonlimiting examples also shows a mounting collar 5 surrounding the light pod 3, wherein the mounting collar 5 is a flanged collar for mounting the fixture LF2. Other examples of mounting collars 5 for different ceiling types include but are not limited to gypsum or plaster collars, mud-in-ring collars, millwork collars, and stone collars.

Figure 12:
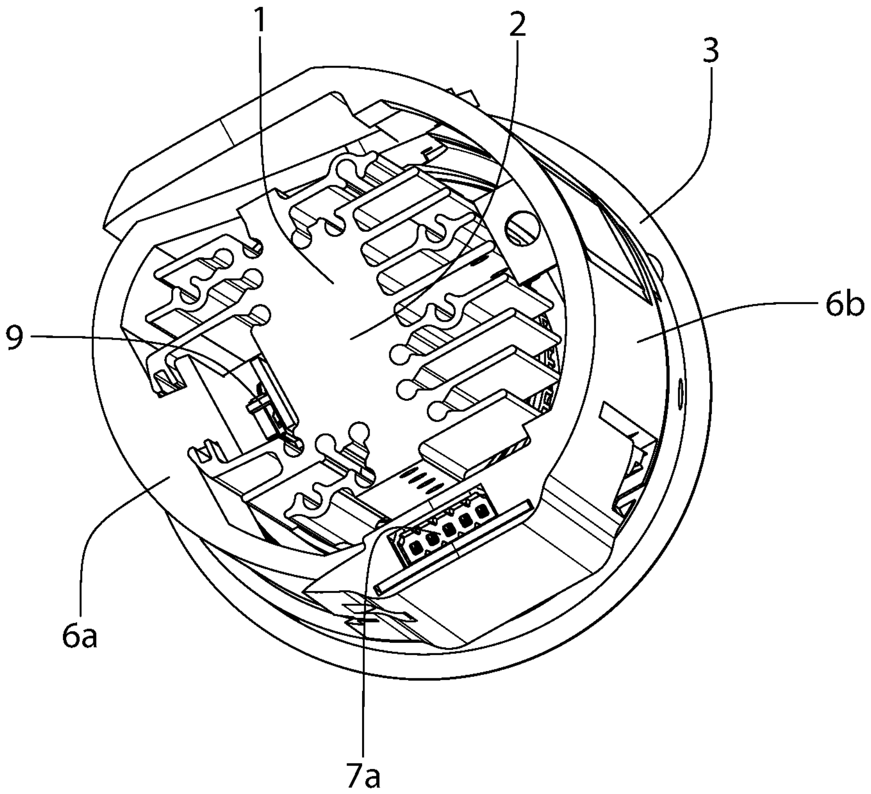
FIG. 12 shows the transfer board within the heat sink of the core light assembly of the invention.

FIG. 12 shows the transfer board 9 within the heat sink 2 of the core light assembly 1. The housing mechanical component 6*b* surrounds the heatsink 2 and further includes an open housing mechanical component 6*a* to permit passive cooling of the fixture. The transfer board 9 receives power and signal from the mother/daughter control board 7 (FIG. 13). The motherboard, power, and control input 7*a* is shown, wherein a mother card 7 (FIG. 13) is inserted into the input 7*a* in a nonremovable configuration, permitting input from the control board 7 to be output to the light pod 3. In certain examples, the transfer board 9 includes components including but not limited to a thermal switch, connectors, and/or other components such as an occupancy sensor, and battery test switch.

FIG. 13 shows an exploded view of an exemplary fixture LF2. The housing (6*a*, 6*b*) includes the housing mechanical component 6*a* surrounding the heat sink 2 and is coupled to housing portion 6*b*. Housing mechanical component 6*b* includes an input 7*a* (FIG. 12) into which the mother card 7 can be inserted into the input 7*a*. A daughter card 8 that is interchangeable and removable is also included in the fixture LF2, wherein the daughter card 8 provides power and control of LED light sources, such as RGBW (red+green+blue+white), RGBWW (red+green+blue+white+warm white), tunable color, tunable white, other dynamic light sources, and other components such as sensors. Examples of control methods employed by the daughter card 8 include but are not limited to digital multiplex (DMX), 0-10V controls, antenna, on-demand lighting and wireless controls for light sources including RGBW, RGBWW, tunable color, tunable white, and other dynamic light sources.

Figure 15:
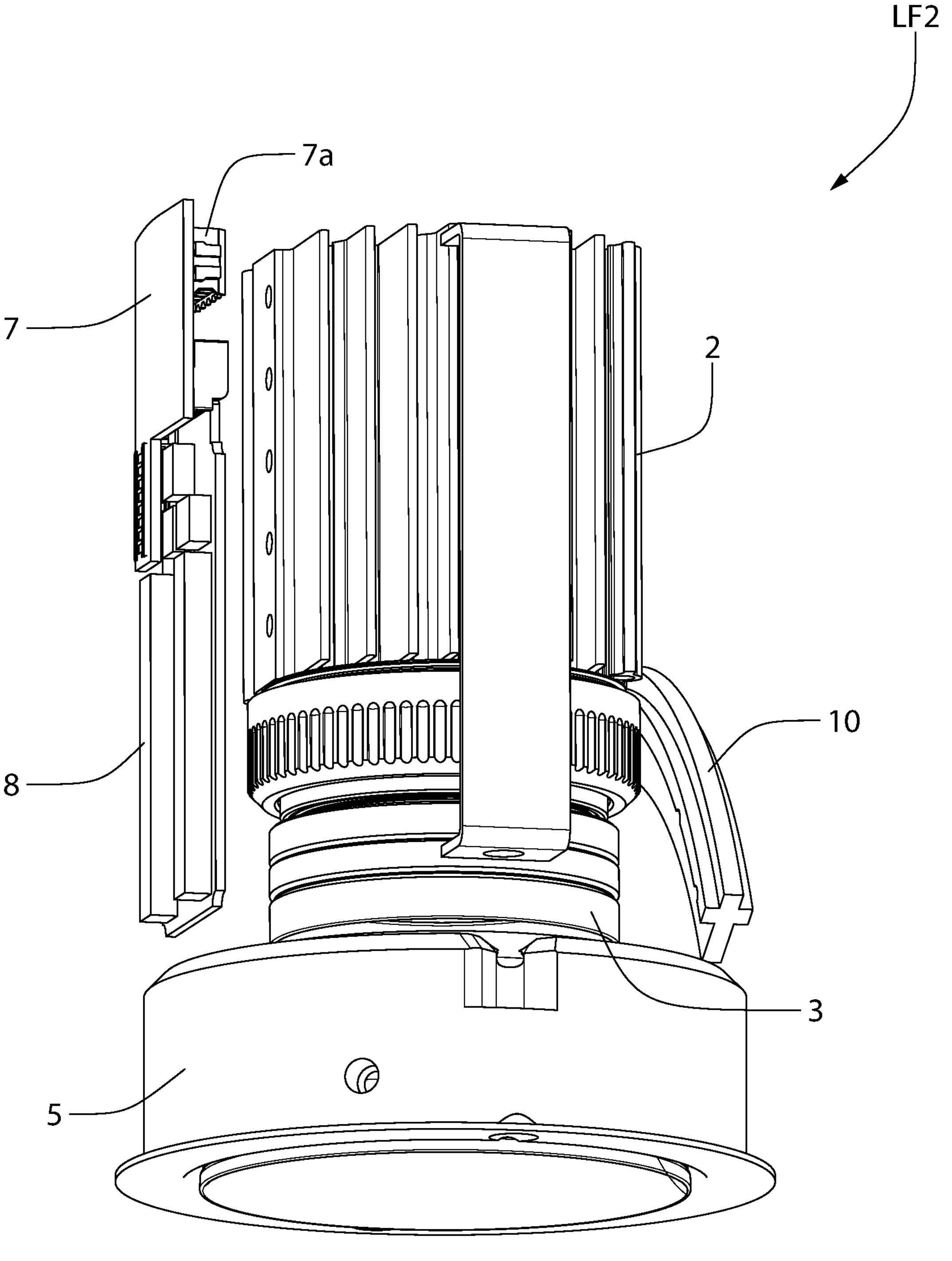
FIG. 15 shows a side, partially exploded view of an additional example of a fixture of the invention.

FIG. 14 shows a cross-sectional view of optional housing mechanical component 6*b* of an example of the fixture LF2, wherein the optional housing mechanical component is surrounding the core light assembly 1. As shown, the housing mechanical component 6*b* surrounds the heat sink 2. The heat sink 2 includes a transfer board 9 for receiving power and signals from the mother/daughter control board 7 (FIG. 13). The housing mechanical component 6*b* also contains cavities for the motherboard control input 7*a* (or other type of power supply and/or signal control component) and output 8*a* for the mother/daughter card 8 (FIG. 15). The heat sink 2 is coupled to the light pod 3. In this example, the light pod has a bezel trim 4. The housing mechanical component 6*b* is then coupled to the ceiling mounting collar 5.

FIG. 15 shows a side, partially exploded view of an additional example of the fixture LF2 of the invention. In this example, the fixture LF2 also includes a mechanical guide 10 permitting the angle of the fixture and direction of light to be adjusted. In other examples, the fixture does not include a mechanical guide 10. The example also shows the motherboard 7 with control input 7*a* and removable daughter card 8. In certain examples, the motherboard 7 and daughter card 8 are mounted to the inside of the housing 6*b* (FIG. 14). In other examples, a housing 6*b* is not used. This particular example also shows the heat sink 2 mounted to the light pod 3, wherein the light pod 3 is coupled to a ceiling mounting collar 5.

Figure 16:
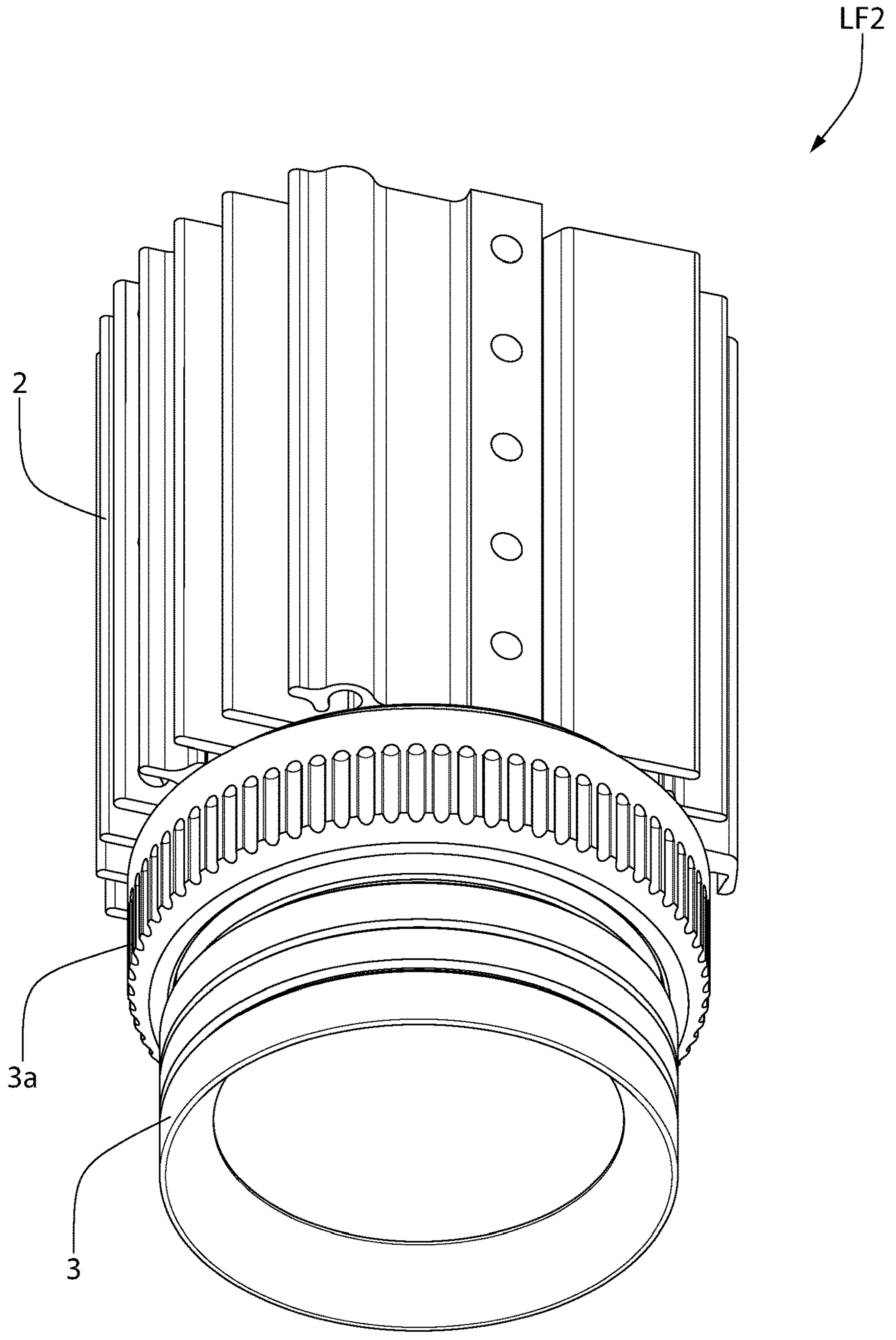
FIG. 16 shows a perspective view of another example of the fixture of the invention.

FIG. 16 shows a perspective view of another example of the fixture LF2 of the invention. Here, the mounting ring 3*a* is shown more clearly. When the heat sink component 2 is mated with the light pod 3, the mounting ring 3*a* is twisted, tightening the light pod 3 around the heat sink component 2. Therefore, the light pod 3 can be interchanged without removing the remainder of the fixture LF2 from the ceiling and without the need for tools or connecting loose wires.

Figure 17:
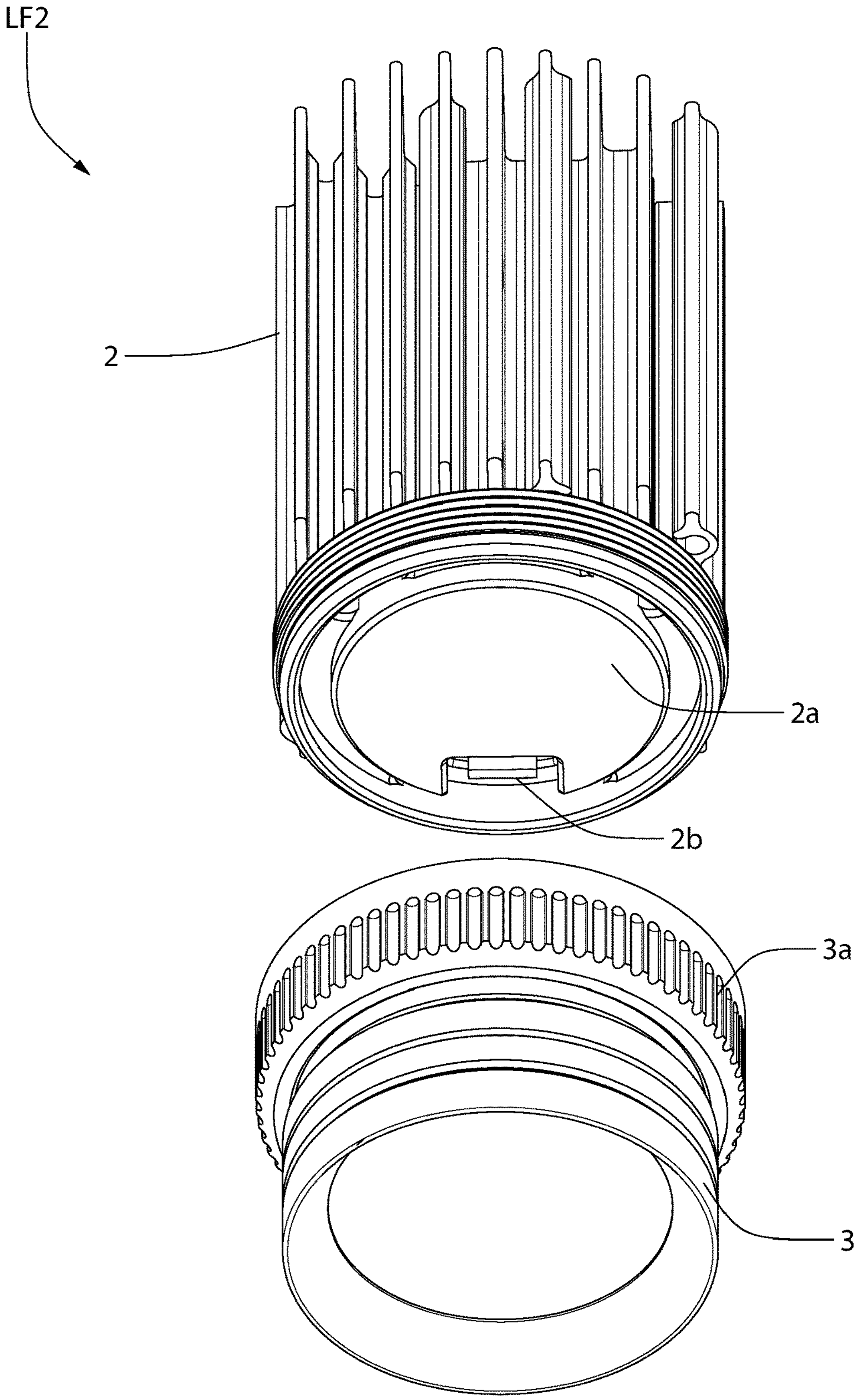
FIG. 17 shows an exploded view of an exemplary fixture of the invention showing mating of the heat sink to the light pod.

FIG. 17 shows an exploded view of an exemplary fixture LF2 of the invention showing the mating of the heat sink 2 to the light pod 3. The heat sink 2 includes a mechanical pad 2*a* with a threaded circumference, allowing the mechanical pad 2*a* to make a thermal, electrical, and secure mechanical connection to another mechanical pad 3*e* (FIG. 21) on the light pod 3. The heat sink also includes a mating electrical connector 2*b*, permitting a connection with mating electrical connector 3*f* (FIG. 21) on the light pod 3. In certain examples, mating electrical connector 2*b* is a female connector and mating electrical connector 3*f* is a male connector. In other examples, mating electrical connector 2*b* is a male connector and mating electrical connector 3*f* is a female connector. Once mating electrical connector 2*b* is mated with connector 3*f* and mechanical pad 2*a* makes connect with mechanical pad 3*e*, the mounting ring 3*a* is tightened around the threader circumference of mechanical pad 2*a* on the heat sink 2, locking the light pod 3 in place and mating the light pod 3 with the heat sink 2.

FIG. 18 shows a perspective view of an exemplary light pod 3. In this example, the emission side of the light pod 3 is shown, where the media emission surface 3*c* is coupled to mechanical holder 3*b* within the light pod 3. In certain examples, the media emission surface 3*c* is an optical lens or light source. In other examples, the media emission surface 3*c* includes TIR (total internal reflection) optics, a hexagonal cellular louver, an optical film, zoom sublens, collimator film laminated to a lens, color filter, diffused lens, clear lens, beam spreader lens, occupancy sensor lens, Li-Fi lens, or other similar media emission materials. The light pod cap 3*g* surrounds the media emission surface 3*c*. In certain examples, the light pod cap 3*g* includes a beveled formation. In additional examples, the light pod cap 3*g* is adjusted to allow for narrow, medium, or wide beam spreads depending on the user's preference. In certain examples having an adjustable light pod cap 3*g*, the light pod cap 3*g* includes markings to allow the user to identify how narrow or wide the beam of light emitted from the media emission surface 3*c* will be.

Examples using the light pod 3 permit the user to change the light source without removing the fixture from the ceiling. After the light pod 3 is no longer functional, the light pod 3 can be interchanged by loosening the mounting ring 3*a*, removing the light pod 3 from the heat sink 2 (FIG. 17), providing a new second light pod, and releasably securing the second light pod to the heat sink 2. This system allows for replacement of the light pod 3 without removal or replacement of the entire fixture and without the use of tools. The modular light pod 3 also reduces waste by only requiring replacement of one component, rather than the whole fixture.

Figure 19:
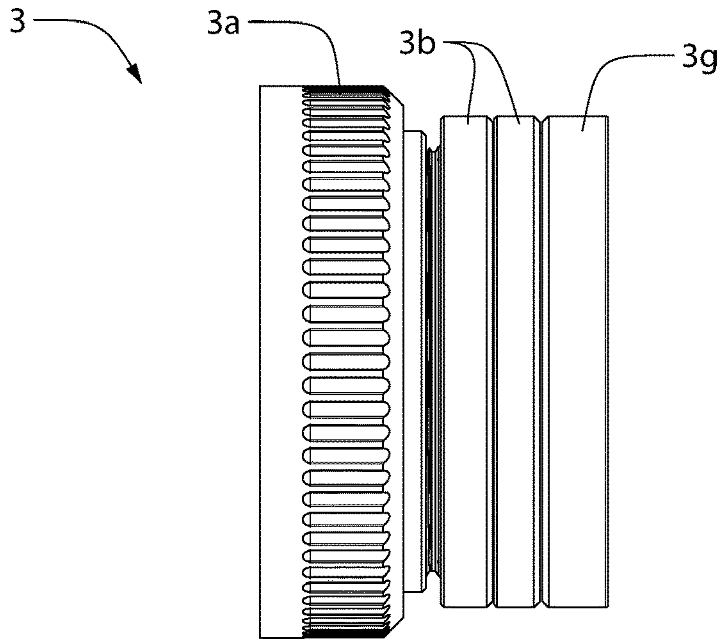
FIG. 19 shows a side view of an exemplary light pod.

FIG. 19 shows a side view of an exemplary light pod 3. The light pod shows the mounting ring 3*a* coupled to the mechanical holder 3*b*, which in turn is coupled to the light pod cap 3*g*.

FIG. 20 shows a perspective overhead view of an exemplary light pod 3 with the transfer board 9 inserted into control input 7*a*. The light pod 3 includes the mounting ring 3*a* which tightens the light pod 3 to the heat sink 2 (FIG. 17). As previously shown in other examples, the mounting ring 3*a* is coupled to a mechanical holder 3*b*, which in turn is coupled to the light pod cap 3*g*. In certain examples, the light pod cap 3*g* is adjustable to adjust the width or narrowness of the light beam emitted from the media emission surface 3*c* (FIG. 18). Additionally, on the end of the light pod 3 opposite the media emission surface 3*c*, mechanical pad 3*e* is shown. The mechanical pad 3*e* of the light pod 3 makes contact with the mechanical pad 2*a* (FIG. 17), permitting a thermal electrical connection to travel between the light pod 3 and heat sink 2 (FIG. 17) without the use of loose wires or the need to attach the light pod 3 with tools. The transfer board 9 of the heat sink 2 (FIG. 17) mates with the control input 7*a* of the light pod 3.

Figure 21:
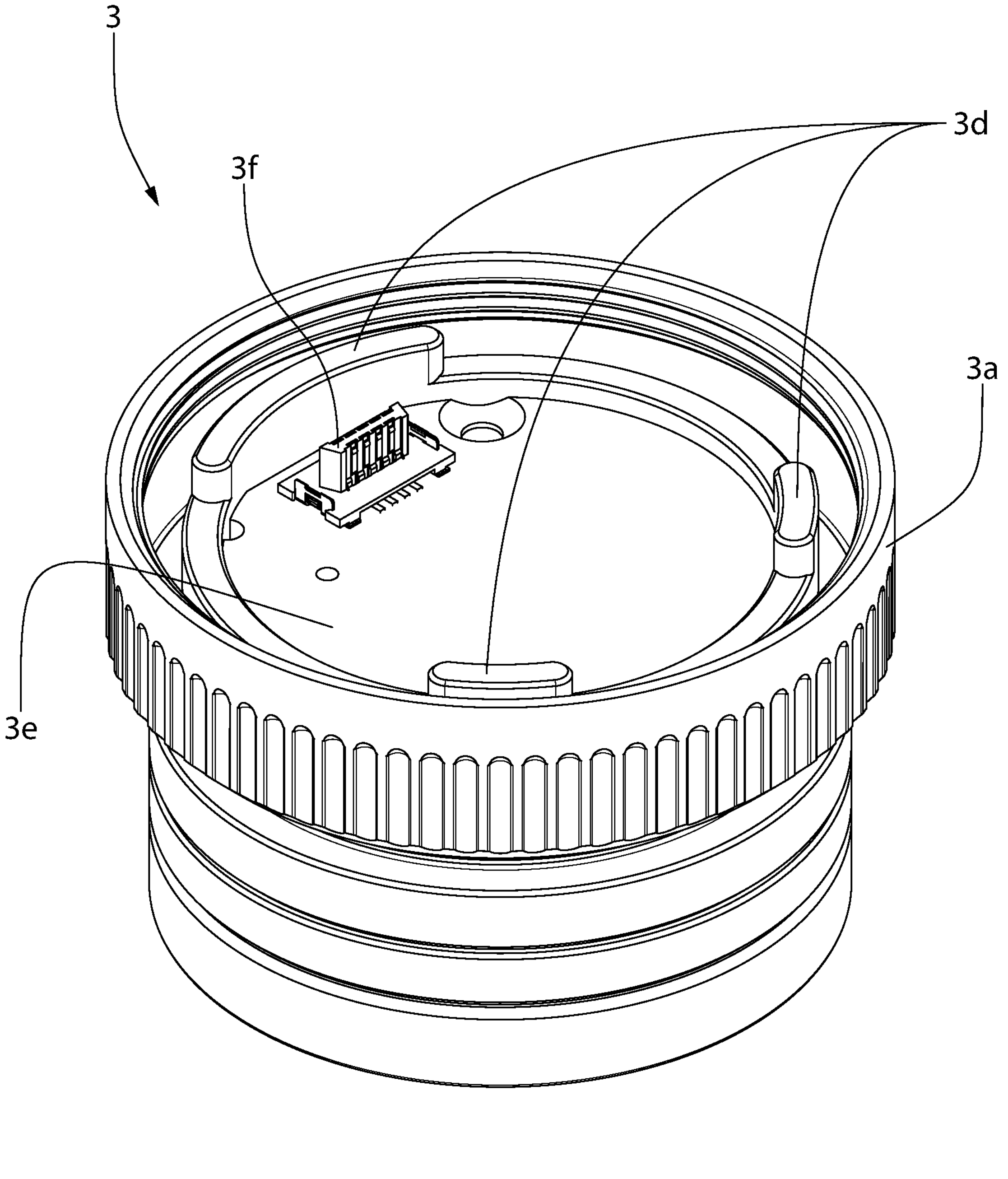
FIG. 21 shows a perspective overhead view of another exemplary light pod.

FIG. 21 shows a perspective overhead view of another exemplary light pod 3. The exemplary light pod 3 is shown from the surface that mates with the heat sink 2 (FIG. 17). Mechanical pad 3*e* includes the underside of an LED secondary circuit board 126 (FIG. 4*a*) which makes direct connect with the mechanical pad 2*a* (FIG. 17) of the heat sink 2 (FIG. 17) for thermal connection from the light pod 3 to the heat sink 2. In certain examples, the secondary circuit board 126 is selected from the group including a chip-on-board (COB), a ceramic discharge metal halide (CDM), LEDs, or other similar sources. The exemplary light pod 3 also includes aligning components 3*d*, for example, positive keys, which helps align the light pod 3 with the mechanical pad 2*a* (FIG. 17) of the heat sink 2 (FIG. 17). In examples wherein the light pod 3 includes positive key aligning components 3*d*, the mechanical pad 2*a* (FIG. 17) includes recessed negative keys, wherein the positive key aligning components 3*d* mate with the negative keys. However, in other examples, the light pod 3 includes negative keys and the mechanical pad 2*a* (FIG. 17) includes positive keys. Mating electrical connector 3*f* is also shown, wherein the mating electrical connector of the heat sink 2*b* (FIG. 17) locks into the mating electrical connector 3*f* of the light pod 3*f*, and the mounting ring 3*a* is tightened to hold the light pod 3 in place mated with the heat sink 2 (FIG. 17).

Figure 22:
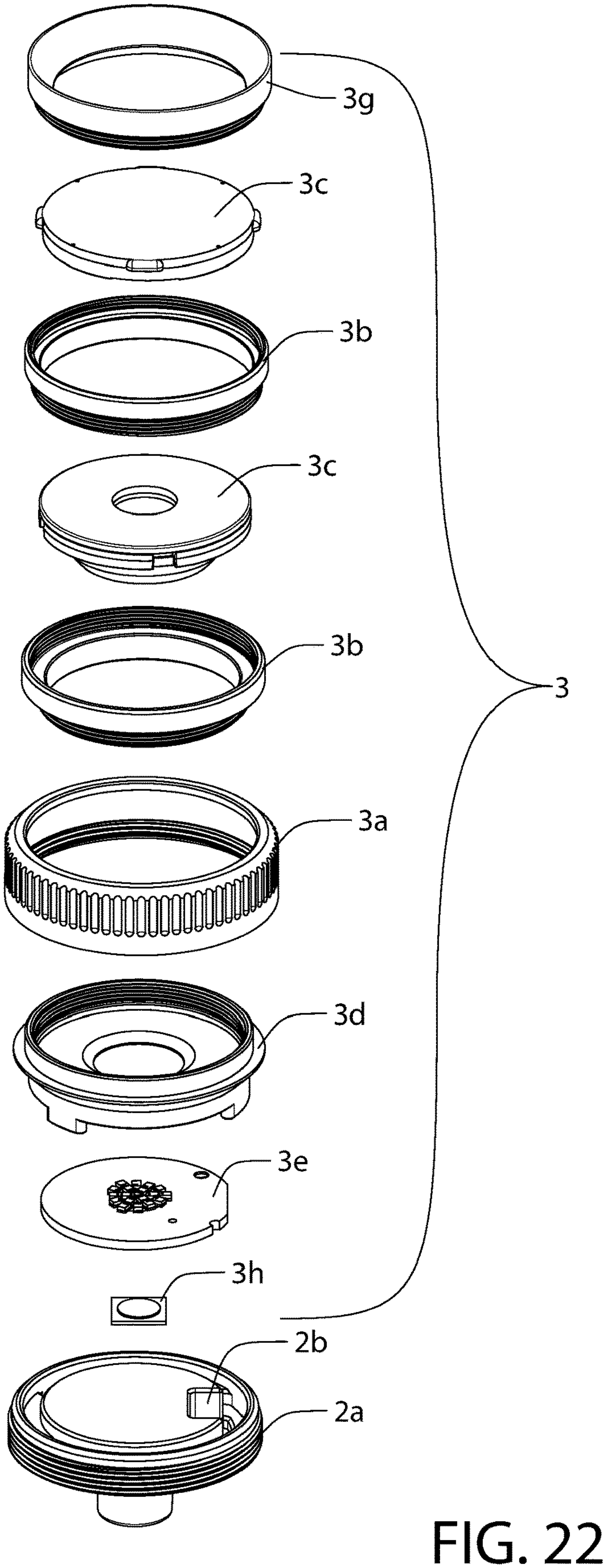
FIG. 22 shows an exploded view of a light pod of the invention and a view of the mechanical pad of the heat sink.

FIG. 22 shows an exploded view of a light pod 3 of the invention and a view of the mechanical pad 2*a* of the heat sink 2 (FIG. 17). The example shows the mechanical pad 2*a* of the heat sink 2 (FIG. 17), as well as the mating electrical connector 2*b*. Mechanical pad 2*a* and electrical connector 2*b*, shown here in exploded view only for exemplary purposes, are permanently mounted to the heat sink 2 (FIG. 17). In certain examples, the secondary circuit board 3*h* is soldered or mounted to a holder 11 (FIGS. 23A and 23B) or, alternatively, mechanical pad 3*e* is used, wherein the mechanical pad 3*e* includes the secondary circuit board 126 (FIG. 4*a*) as a single piece. In certain examples, the secondary circuit board 3*h* is a chip-on-board (COB) having a holder 11 (FIGS. 23A and 23B) including a cut-out to permit a light source, such as a plurality of LEDS, to shine through the media emission surface 3*c*. In other examples, such as those where the secondary circuit board 3*h* is another source such as a tightly spaced array of LED chips. In this example, aligning component 3*d* is coupled to the mechanical pad 3*e* to secure the mechanical pad 3*e* and included circuit board 126 (FIG. 4*a*) in place. In this example, aligning component 3*d* is lengthened and includes a threaded area, adding greater security of the light pod 3 to the hat sink 2 (FIG. 17) when different types of media are used. Aligning component 3*d* directly couples to mechanical holder 3*b*. Mechanical holder 3*b* surrounds the media emission surface 3*c* and allows part of the media emission surface 3*c* to extend outside of the mechanical holder 3*b* to direct light out of the fixture. As mechanical holder 3*b* is coupled to aligning component 3*d*, a mounting ring 3*a* mates with the threads on the mechanical holder 3*b* and/or aligning component 3*d*. Approximately half of the threads on the mounting ring 3*a*, e.g., a proximal half, mate with threads on the mechanical holder 3*b* and/or aligning component 3*d*. The other half of threads on the mounting ring 3*a*, e.g., a distal half, will interlock with the mechanical pad 2*a* on the heat sink 2 (FIG. 17). When the mounting ring 3*a* is tightened, the light pod 3 is secured to the heat sink 2 (FIG. 17). In certain examples, a light pod cap 3*g* surrounds the media emission surface 3*c* and is coupled to the mechanical holder 3*b*. In certain examples, the light pod cap 3*g* is stationary and aids in directing the light beam of the fixture, whereas in other examples, the light pod cap 3*g* is adjustable and can alter its angle to create wider or narrower beams of light existing the fixture. In other examples using optical assemblies 112 (FIG. 1) such as louvers, zoom lenses, or frosted lenses already including a media emission surface 3*c*, components 3*b* and 3*c* are not necessary to mount the optical assembly (shown by way of example as optical assembly 112 in FIG. 1) in the light fixture LF2.

Figure 23A:
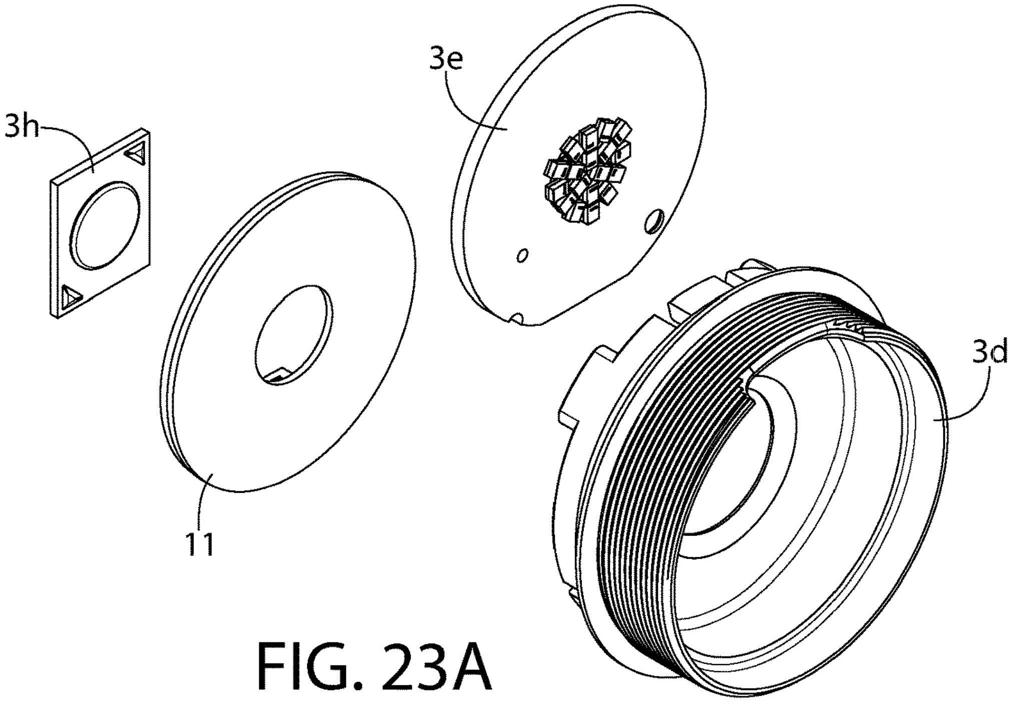
FIG. 23A shows a perspective view of the front of a partial exemplary light pod 3 (FIG. 22) of the invention.

FIG. 23A shows a perspective view of the front of a partial exemplary light pod 3 (FIG. 22) of the invention. In this example, the aligning component 3*d* of the light pod 3 (FIG. 22) is shown. In certain examples, a secondary circuit board 3*h* is mounted to aligning component 3*d*. In still further examples, secondary circuit board 3*h* is mounted on a holder 11. In examples where the secondary circuit board 3*h* is a chip-on-board (COB), the holder 11 includes contacts which align with contacts on the COB, powering the COB. In other examples, the secondary circuit board 3*h* includes a tightly spaced array of LED chips. As an alternative to using a secondary circuit board 3*h*, a second mechanical pad 3*e* is used, already integrating a secondary circuit board (126 in FIG. 3 or 3*h*) into the mechanical pad 3*e* as a single component. The second mechanical pad 3*e* is then mounted to alignment component 3*d*. It is to be understood that while certain examples of secondary circuit board 3*h*, such as a COB, require a holder, other types of secondary circuit boards do not require a holder.

Figure 23B:
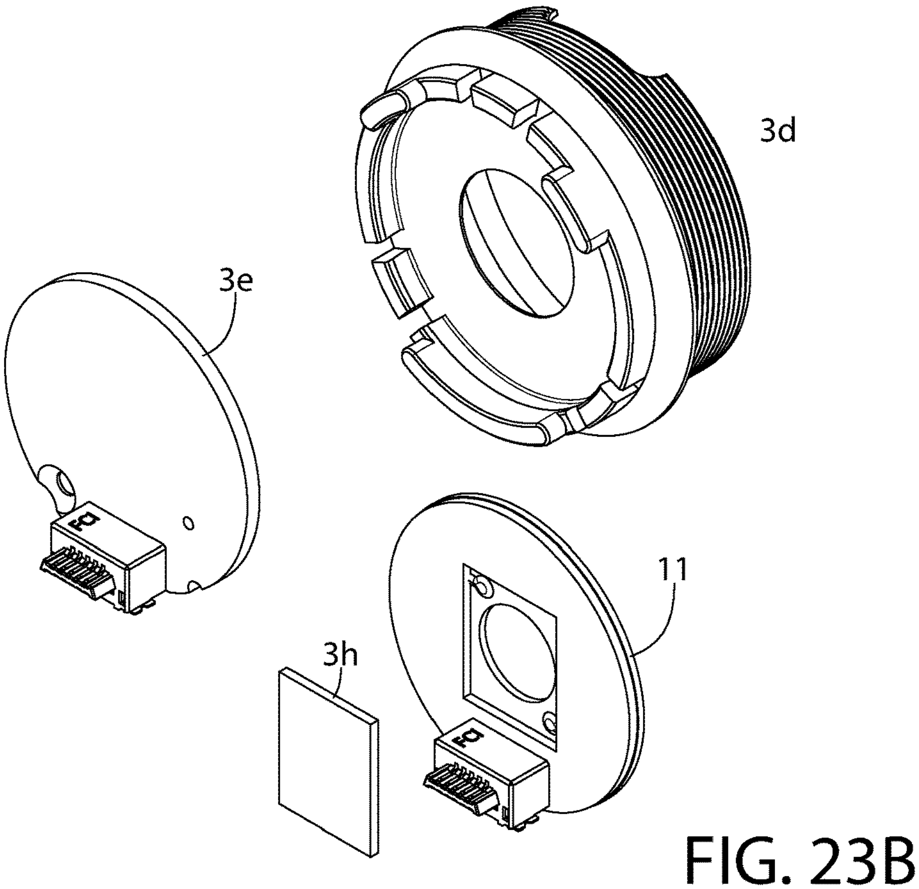
FIG. 23B shows a perspective view of the back of a partial exemplary light pod 3 (FIG. 22) of the invention.

FIG. 23B shows a perspective view of the back of a partial exemplary light pod 3 (FIG. 22) of the invention. The aligning component 3*d* of the light pod 3 (FIG. 22) is shown. As previously discussed, in certain examples, secondary circuit board 3*h* is used, or, alternatively, second mechanical pad 3*e* is used. In this particular example, the secondary circuit board 3*h* is a chip-on-board (COB), and the holder 11 is used. The secondary circuit board 3*h* is mounted to a holder 11, which is in turn mounted to the aligning component 3*d*. As an alternative, the single piece second mechanical pad 3*e* is mounted to the aligning component 3*d* without the need for a secondary circuit board 3*h* or holder 11.

It is also within the broadest scope of the invention that if a non-heat generating light source is used, the heat sink would be replaced with a holder or mounting component to hold the light pod. Moreover, it should be noted that the mother/daughter assembly is currently positioned adjacent to the heat sink, but if a light source that does not generate heat is used in close proximity to the power or signal mother/daughter assembly, or if heat is otherwise diverted from the mother/daughter assembly, then the mother/daughter assembly board can be mounted directly next to the transfer board, or the mother/daughter assembly board can include the transfer board, where this assembly or some portion of this assembly can be located directly in the housing or mounting supporting the light pod.

While the invention has been described in detail and with reference to specific examples thereof, it will be apparent to one skilled in the art that various changes and modifications can be made therein without departing from the spirit and scope thereof.

REFERENCE NUMBERS

LF1—LIGHT FIXTURE EXAMPLE 1
LF2—LIGHT FIXTURE EXAMPLE 2
1—CORE LIGHTING ASSEMBLY
2—HEAT SINK
2*a*—FIRST MECHANICAL PAD (HEAT SINK)
2*b*—FIRST MATING ELECTRICAL CONNECTOR (HEAT SINK)
3—LIGHT POD
3*a*—MOUNTING RING
3*b*—MECHANICAL HOLDER
3*c*—MEDIA EMISSION SURFACE
3*d*—ALIGNING COMPONENTS
3*e*—SECOND MECHANICAL PAD (LIGHT POD)
3*f*—SECOND MATING ELECTRICAL CONNECTOR (LIGHT POD)
3*g*—LIGHT POD CAP
3*h*—SECONDARY CIRCUIT BOARD
4—BEZEL TRIM
5—MOUNTING COLLAR
6—HOUSING
6*a*—HOUSING MECHANICAL COMPONENT
6*b*—HOUSING MECHANICAL COMPONENT
7—MOTHER CONTROL BOARD (MOTHERBOARD)
7*a*—CONTROL BOARD INPUT
8—DAUGHTER CARD
8*a*—OUTPUT FOR MOTHER/DAUGHTER CARD
9—TRANSFER BOARD
10—MECHANICAL GUIDE
11—HOLDER (FOR SECONDARY CIRCUIT BOARD)
102—HEAT SINK
104—LIGHT BLOCKING SHIELD
106—JOINT
108—MOUNTING UNIT
110—BEZEL
112—OPTICAL ASSEMBLY
114—UNIVERSAL CONNECTOR
116—MEDIA HOLDER
118—MULTI-PORT CONNECTOR
120—TRANSFER PCB CONTACTS
122—COB HOLDER
124—TRANSFER PCB
126—SECONDARY CIRCUIT BOARD
128—MEDIA HOLDER BASE
130—WINDOW
132—MEDIA HOLDER COVER
134—FASTENER
136—RECESS (FOR RECEIVING FASTENERS FOR TWIST-AND-LOCK MECHANISM)
138—EXPANDABLE UNIT
140—CEILING MOUNTING BRACKETS
142—OPTIONAL TRIM

What is claimed is:

1. A modular light apparatus, wherein the apparatus comprises:

a heat sink, said heat sink comprising the first mechanical pad and a first mating electrical connector, wherein the mechanical pad is capable of transferring an electrical signal on its surface;

a light pod releasably secured to the heat sink, wherein the light pod further comprises a mounting ring, a second mechanical pad, and a second mating electrical connector;

a mother/daughter assembly, wherein the mother/daughter assembly includes a motherboard card and a removable daughter card;

a mother control board input, wherein the motherboard control input is embedded within the heat sink and the mother/daughter assembly removably couples to the mother control board input; and an output for the mother/daughter assembly, wherein the output is embedded within the beat sink and provides power to the light pod when the light pod is releasably secured to the heat sink;

wherein the second mating electrical connector of the light pod mates with the first mating electrical connector of the heat sink;

wherein the second mechanical pad of the light pod makes direct contact with the first mechanical pad of the heat sink when the light pod is removably secured to the heat sink; and wherein the mounting ring tightens and secures the light pod to the heat sink when the light pod is removably secured to the heat sink.

2. The apparatus of claim 1, wherein the light pod further comprises a mechanical holder and a media emission surface, wherein the mechanical holder houses the media emission surface.

3. The apparatus of claim 2, wherein the media emission surface is selected form the group consisting of an optical lens, LED light source, TIR optics, a hexagonal cellular louver, an optical film, zoom sublens, collimator film laminated to a lens, color filter, diffused lens, occupancy sensor lens, Li-Fi lens, clear lens, and a beam spreader lens.

4. The apparatus of claim 1, wherein the light pod further comprises a light pod cap.

5. The apparatus of claim 1, further comprising a housing.

6. The apparatus of claim 1, further comprising a transfer board for receiving power and signals from said mother/daughter assembly.

7. A modular light apparatus, wherein the apparatus comprises:

a heat sink, said heat sink comprising the first mechanical pad and a first mating electrical connector, wherein the mechanical pad is capable of transferring an electrical signal on its surface;

a light pod releasably secured to the heat sink, wherein the light pod further comprises a mounting ring, a secondary circuit board, and a second mating electrical connector;

a mother/daughter assembly, wherein the mother/daughter assembly includes a motherboard card and a removable daughter card;

a mother control board input, wherein the motherboard control input is embedded within the heat sink and the mother/daughter assembly removably couples to the mother control board input; and an output for the mother/daughter assembly, wherein the output is embedded within the heat sink and provides power to the light pod when the light pod is releasably secured to the heat sink;

wherein the second mating electrical connector of the light pod mates with the first mating electrical connector of the heat sink;

wherein the secondary circuit board of the light pod makes direct contact with the first mechanical pad of the heat sink when the light pod is removably secured to the heat sink; and wherein the mounting ring tightens and secures the light pod to the heat sink when the light pod is removably secured to the heat sink.

8. The apparatus of claim 7, wherein the light pod further comprises a mechanical holder and a media emission surface, wherein the mechanical holder houses the media emission surface.

9. The apparatus of claim 8, wherein the media emission surface is selected form the group consisting of an optical lens, LED light source, TIR optics, a hexagonal cellular louver, an optical film, zoom sublens, collimator film laminated to a lens, color filter, diffused lens, occupancy sensor lens, Li-Fi lens, clear lens, and a beam spreader lens.

10. The apparatus of claim 7, wherein the light pod further comprises a light pod cap.

11. The apparatus of claim 7, wherein the light pod further comprises a holder, wherein the secondary circuit board is mounted onto said holder.

12. The apparatus of claim 7, further comprising a housing.

13. The apparatus of claim 7, further comprising a transfer board for receiving power and signals from said mother/daughter assembly.

14. A modular lighting apparatus, wherein the apparatus comprises:

a mounting unit to which a heat sink is coupled, said heat sink comprising an electrical conductor having a first connector, configured for coupling to a power supply, on a first end and a second connector on its other end, said second connector being positioned at a base portion of said heat sink, said connector having a pair of electrical contacts; and a media holder comprising a transfer printed circuit board (PCB) and an optical assembly including a light source electrically coupled together, said transfer PCB comprising a corresponding pair of electrical contacts such that when said media holder is releasably secured to said base portion of said heat sink, corresponding pair of electrical contacts are in electrical contact with said pair of electrical contacts of said second connector, thereby powering said light source without the need to connect any connectors or wires together.

15. The apparatus of claim 14, wherein said second connector comprises a multi-port connector.

16. The apparatus of claim 14, wherein said first connector comprises a universal connector.

17. The apparatus of claim 14, wherein the media holder further comprises a chip on board holder.

18. The apparatus of claim 14, wherein the optical assembly comprises a lens and a housing.

19. The apparatus of claim 14, wherein the light source is selected from the group consisting of a light emitting diode (LED) bulb, an LED board, a laser, a halogen bulb, an incandescent bulb, and a compact florescent fluorescent bulb.

20. The apparatus of claim 14, further comprising a joint.

21. The apparatus of claim 20, wherein the joint is selected from the group consisting of a hinge and a ball-in-socket.

22. The apparatus of claim 14, further comprising a light blocking shield.

23. A method of providing a modular light apparatus that requires no loose wires for electrically-powering said light apparatus, said method comprising:

providing a heat sink, wherein the heat sink comprises a first mechanical pad and a first mating electrical connector, wherein the first mechanical pad is capable of transferring an electrical signal on its surface;

providing a light pod, wherein the light pod comprises a mounting ring, a mechanical holder, and a media emission surface, a second mechanical pad, and a second mating electrical connector, wherein the mechanical holder houses the media emission surface;

a mother/daughter assembly, wherein the mother/daughter assembly includes a motherboard card and a removable daughter card;

a mother control board input, wherein the motherboard control input is embedded within the heat sink and the mother/daughter assembly removably couples to the mother control board input; and an output for the mother/daughter assembly, wherein the output is embedded within the heat sink and provides power to the light pod when the light pod is releasably secured to the heat sink;

releasably securing the light pod to the heat sink by mating the second mating electrical connector of the light pod with the first mating electrical connector of the heat sink and allowing the second mechanical pad of the light pod to make direct contact with the first mechanical pad of the heat sink; and tightening the mounting ring to releasably secure the light pod to the heat sink.

24. The method of claim 23, further including:

loosening the mounting ring after use of the light pod;

removing the light pod from the heat sink;

providing a second light pod; and releasably securing the second light pod to the heat sink by mating a second mating electrical connector of the second light pod with the first mating electrical connector of the heat sink and allowing a second mechanical pad of the second light pod to make direct contact with the first mechanical pad of the heat sink; and tightening a mounting ring of the second light pod to releasably secure the second light pod to the heat sink.

25. The method of claim 23, further comprising providing a transfer board and coupling the transfer board to the heat sink, said transfer board receiving power and signals from said mother/daughter assembly.

* * * * *